(12) United States Patent
Musat et al.

(10) Patent No.: US 8,010,614 B1
(45) Date of Patent: Aug. 30, 2011

(54) SYSTEMS AND METHODS FOR GENERATING SIGNATURES FOR ELECTRONIC COMMUNICATION CLASSIFICATION

(75) Inventors: Claudiu C. N. Musat, Buzau (RO); Catalin A. Cosoi, Buzau (RO)

(73) Assignee: Bitdefender IPR Management Ltd., Nicosia (CY)

( * ) Notice: Subject to any disclaimer, the term of this patent is extended or adjusted under 35 U.S.C. 154(b) by 300 days.

(21) Appl. No.: 11/933,515

(22) Filed: Nov. 1, 2007

(51) Int. Cl.
*G06F 15/16* (2006.01)
*G06F 15/177* (2006.01)
*G06F 15/173* (2006.01)

(52) U.S. Cl. ........ 709/206; 709/220; 709/221; 709/222; 709/223; 709/224; 709/225

(58) Field of Classification Search .................. 709/206, 709/220–225
See application file for complete search history.

(56) References Cited

U.S. PATENT DOCUMENTS

| | | | |
|---|---|---|---|
| 4,914,708 A | 4/1990 | Carpenter et al. |
| 5,040,214 A | 8/1991 | Grossberg et al. |
| 5,133,021 A | 7/1992 | Carpenter et al. |
| 5,142,590 A | 8/1992 | Carpenter et al. |
| 5,157,738 A | 10/1992 | Carpenter et al. |
| 5,214,715 A | 5/1993 | Carpenter et al. |
| 5,218,646 A | 6/1993 | Sirat et al. |
| 5,311,601 A | 5/1994 | Carpenter et al. |
| 5,361,353 A | 11/1994 | Carr et al. |
| 5,619,619 A | 4/1997 | Shinohara et al. |
| 5,627,748 A | 5/1997 | Baker |
| 5,680,475 A | 10/1997 | Zwierski et al. |
| 6,023,723 A | 2/2000 | McCormick et al. |
| 6,052,709 A | 4/2000 | Paul |
| 6,161,130 A | 12/2000 | Horvitz et al. |
| 6,373,971 B1 | 4/2002 | Floratos |
| 6,415,286 B1 | 7/2002 | Passera et al. |
| 6,421,709 B1 | 7/2002 | McCormick et al. |
| 6,533,822 B2 | 3/2003 | Kupiec |
| 6,542,635 B1 | 4/2003 | Hu et al. |
| 6,564,202 B1 | 5/2003 | Schuetze et al. |
| 6,571,230 B1 | 5/2003 | Parida |
| 6,598,054 B2 | 7/2003 | Schuetze et al. |

(Continued)

OTHER PUBLICATIONS

Rigoutsos, I. et al., Combinatorial pattern discovery in biological sequences: the Teiresias algorithm, Bioinformatics, Dec. 15, 1997, pp. 55-67, vol. 14 No. 1, Oxford University Press.

(Continued)

*Primary Examiner* — Phuoc Nguyen
*Assistant Examiner* — Clarence John
(74) *Attorney, Agent, or Firm* — Law Office of Andrei D Popovici, PC

(57) ABSTRACT

In some embodiments, fully-automated spam identification is facilitated by accelerating a signature extraction process, allowing the use of a relatively large number of signatures finely tailored to individual spam waves, rather than a smaller number of highly-accurate signatures generated under human supervision. The signature extraction process is performed in a distributed manner. A message corpus is classified into a plurality of message clusters. Cluster-specific spam identification text patterns are extracted selectively from members of each cluster, and the text patterns are combined into cluster-specific spam identification signatures. A cluster may represent an individual spam wave. Genetic algorithms are used to optimize the set of spam identification signatures by selecting the highest-performing combinations of cluster-specific spam identification text patterns. Performing signature extraction at a subclass level allows accelerating the signature extraction process, which in turn allows frequent signature updates and facilitates fully automated spam identification.

24 Claims, 14 Drawing Sheets

U.S. PATENT DOCUMENTS

| | | | |
|---|---|---|---|
| 6,654,787 | B1 | 11/2003 | Aronson et al. |
| 6,687,740 | B1 | 2/2004 | Gough et al. |
| 6,701,305 | B1 | 3/2004 | Holt et al. |
| 6,708,205 | B2 | 3/2004 | Sheldon et al. |
| 6,714,874 | B1 | 3/2004 | Myers |
| 6,718,368 | B1 | 4/2004 | Ayyadurai |
| 6,772,196 | B1 | 8/2004 | Kirsch |
| 6,901,398 | B1 | 5/2005 | Horvitz et al. |
| 6,941,321 | B2 | 9/2005 | Schuetze et al. |
| 6,963,869 | B2 | 11/2005 | Burrows |
| 7,076,527 | B2 | 7/2006 | Bellegarda et al. |
| 7,130,850 | B2 | 10/2006 | Russell-Falla et al. |
| 7,178,099 | B2 | 2/2007 | Meyer et al. |
| 7,203,680 | B2 | 4/2007 | Parida |
| 7,257,564 | B2 | 8/2007 | Loughmiller et al. |
| 7,349,901 | B2 | 3/2008 | Ramarathnam et al. |
| 7,519,565 | B2 | 4/2009 | Prakash et al. |
| 7,555,523 | B1* | 6/2009 | Hartmann ............ 709/206 |
| 7,577,656 | B2 | 8/2009 | Kawai et al. |
| 7,610,342 | B1 | 10/2009 | Pettigrew et al. |
| 7,617,285 | B1 | 11/2009 | Hartmann |
| 2002/0078349 | A1 | 6/2002 | Marso et al. |
| 2003/0041126 | A1 | 2/2003 | Buford et al. |
| 2003/0135555 | A1 | 7/2003 | Birrel et al. |
| 2003/0220978 | A1 | 11/2003 | Rhodes |
| 2004/0083270 | A1 | 4/2004 | Heckerman |
| 2004/0167968 | A1 | 8/2004 | Wilson et al. |
| 2004/0177110 | A1 | 9/2004 | Rounthwaite et al. |
| 2004/0199594 | A1 | 10/2004 | Radatti et al. |
| 2004/0221012 | A1 | 11/2004 | Heumesser |
| 2004/0260776 | A1 | 12/2004 | Starbuck |
| 2005/0076084 | A1 | 4/2005 | Loughmiller |
| 2005/0144241 | A1 | 6/2005 | Stata et al. |
| 2005/0193073 | A1 | 9/2005 | Mehr et al. |
| 2005/0198166 | A1 | 9/2005 | Kawaji |
| 2005/0262209 | A1 | 11/2005 | Yu |
| 2006/0010217 | A1 | 1/2006 | Sood |
| 2006/0015561 | A1 | 1/2006 | Murphy et al. |
| 2006/0015563 | A1 | 1/2006 | Judge et al. |
| 2006/0031319 | A1 | 2/2006 | Nelson et al. |
| 2006/0053203 | A1 | 3/2006 | Mijatovic |
| 2006/0095521 | A1* | 5/2006 | Patinkin ............ 709/206 |
| 2006/0174345 | A1 | 8/2006 | Flanagan |
| 2006/0179052 | A1 | 8/2006 | Pauws |
| 2007/0011323 | A1 | 1/2007 | Gaal |
| 2007/0061402 | A1 | 3/2007 | Mehr et al. |
| 2007/0130262 | A1 | 6/2007 | Williams et al. |
| 2007/0255792 | A1 | 11/2007 | Gronberg |
| 2008/0059590 | A1* | 3/2008 | Sarafijanovic et al. ....... 709/206 |
| 2008/0168144 | A1 | 7/2008 | Lee |
| 2008/0215692 | A1 | 9/2008 | Bosarge et al. |
| 2009/0164598 | A1 | 6/2009 | Nelson et al. |

OTHER PUBLICATIONS

Gilad-Bachrach, R., et al., Margin Based Feature Selection—Theory and Algorithms, Proceedings of the 21st International Conference on Machine Learning, 2004, p. 1-8, Banff, Canada.

Rajasekaran, S., Algorithms for Motif Search, 2001, p. 1-22, CRC Press.

Chinneck, J. W., Chapter 14: Heuristics for Discrete Search: Genetic Algorithms and Stimulated Annealing, Practical Optimization: a Gentle Introduction, 2006, p. 1-10.

Floratos, A., Pattern Discovery in Biology: Theory and Applications, Jan. 1999, p. 1-250, New York.

Vilo, J., Pattern Discovery from Biosequences, 2002, p. 1-158, Report A-2002-3, Helsinki University Printing House, Finland.

Zhang, Y. et al., An Automated Classification Algorithm for Multi-Wavelength Data, SPIE, 2004.

Kurtz, S., Suffix Trees, Effiziente Algorithmen auf Sequenzen, Dec. 1, 2005, p. 1-25, Germany.

Wang, J. et al., Toward Automated E-mail Filtering- an Investigation of Commercial and Academic Approaches, 2003, Taipei, Taiwan.

Musat, C. N., Layout Based Spam Filtering, Proceedings of World Academy of Science, Engineering and Technology, Mar. 2006, p. 1-4, vol. 12, Waset.org.

Cosoi, C., An Anti-Spam Filter Based on Adaptive Neural Networks, 2006, p. 1-8, SpamConference.

Parida, L. et al., An Output- Sensitive Flexible Pattern Discovery Algorithm, 2001, p. 131-142, Springer-Verlag.

Cosoi, U.S. Appl. No. 11/497,662, filed Aug. 1, 2006.

Musat, U.S. Appl. No. 11/536,370, filed Sep. 28, 2006.

Cosoi, U.S. Appl. No. 11/867,547, filed Oct. 4, 2007.

USPTO, Office Action mailed Jul. 23, 2009 for U.S. Appl. No. 11/536,370, filed Sep. 28, 2006.

USPTO, Office Action mailed Aug. 20, 2009 for U.S. Appl. No. 11/497,662, filed Aug. 1, 2006.

USPTO, Office Action mailed Dec. 18, 2009 for U.S. Appl. No. 11/867,547, filed Oct. 4, 2007.

USPTO, Office Action mailed Mar. 4, 2010 for U.S. Appl. No. 11/536,370, filed Sep. 28, 2006.

Cosoi, "Methods for Dynamically Combining Relevancies of Different Antispam Filters," 2007 MIT Spam Conference, Boston MA, Mar. 30, 2007.

Cover, "Estimation by the Nearest Neighbor Rule, IEEE Transactions on Information Theory", vol. IT-14, No. 1, p. 50-55, Jan. 1968.

Cukier et al., "Genres of Spam: Expectations and Deceptions," Proc. 39th Hawaii International Conference on System Sciences, p. 1-10, Jan. 7, 2006.

Graham, A Plan for Spam, Aug 2002. Downloaded from http://www.paulgraham.com/spam.html.

Lundberg, "Uninvited, Unwelcome Medical Email Messages," Medscape Today, www.medscape.com/viewarticle/465734?rss, Posted Dec. 16, 2003.

von Luxburg et al., "Distance-Based Classification with Lipschitz Functions",The Journal of Machine Learning Research, JMLR.Org, USA, 5:669-695, Dec. 2004.

Rigoutsos, I., et al., "Chung-Kwei: a Pattern-discovery-based System for the Automatic Identification of Unsolicited E-mail Messages (SPAM)," p. 1-8, CEAS 2004, Mountain View, CA, Jul. 30-31, 2004.

Tan, "Cascade ARTMAP: Integrating Neural Computation and Symbolic Knowledge Processing," IEEE Trans. Neural Networks 8(2):237-250, Mar. 1997.

Verzi, "Hierarchical ARTMAP," Proc. Int. Joint Conf. on Neural Networks, IJCNN2000, Como, Italy, p. 41-46, Jul. 2000.

Zhang et al., "Location-Based Spatial Queries", ACM SIGMOD 2003, pp. 443-454, San Diego, California, USA, Jun. 2003.

USPTO, Office Action mailed Mar. 9, 2010 for U.S. Appl. No. 11/497,662, filed Aug. 1, 2006.

Androtsopoulos, "Learning to Filter Spam: A Comparison of Naive Bayesian and a Memory-Based Approach," Proc. Workshop "Machine Learning and Textual Information Access," 4th European Conference on Principles and Practice of Knowledge Discovery in Databases, p. 1-13, Sep. 2000.

USPTO, Office Action Mailed Sep. 15, 2010 for U.S. Appl. No. 11/536,370, filed Sep. 28, 2006.

USPTO, Office Action Mailed Sep. 17, 2010 for U.S. Appl. No. 11/497,662, filed Aug. 1, 2006.

USPTO, Office Action mailed Jun. 23, 2010 for U.S. Appl. No. 11/867,547, filed Oct. 4, 2007.

Weenink, "Category ART: A Variation on Adaptive Resonance Theory Neural Networks," Proc. Inst. Phonetic Sci., Univ. of Amsterdam, Amsterdam, Netherlands, 21:117-129, 1997; the year of publication is sufficiently earlier than the effective U.S. filing date and any foreign priority date so that the particular month of publication is not in issue.

Berkhin, "A Survey of Clustering Data Mining Techniques", p. 1-56, Accrue Software Inc., Fremont, CA, 2002; the year of publication is sufficiently earlier than the effective U.S. filing date and any foreign priority date so that the particular month of publication is not in issue.

Burges, "A Tutorial on Support Vector Machines for Pattern Recognition", Data Mining and Knowledge Discovery, Kluwer Academic Publishers, Boston, 2:121-167, 1998; the year of publication is sufficiently earlier than the effective U.S. filing date and any foreign priority date so that the particular month of publication is not in issue.

Carpenter et al., "Adaptive Resonance Theory", Handbook of Brain Theory and Neural Networks, Second Edition, MIT Press, Cambridge, MA, p. 1-12, 2003; the year of publication is sufficiently earlier than the effective U.S. filing date and any foreign priority date so that the particular month of publication is not in issue.

Cormode et al., "The string edit distance matching problem with moves", ACM Transactions on Algorithms (TALG), 3(1):667-676, Feb. 2007.

Dixit et al., "LOHIT: An Online Detection & Control System for Cellular SMS Spam", Proc. IASTED Intl. Conf. Comm., Network, and Information Security, p. 48-54, Phoenix, AZ, Nov. 2005.

Dulucq, S. et al., "Analysis of Tree Edit Distance Algorithms," Lecture Notes in Computer Science 2676, Spinger Berlin Heidelberg, Germany, p. 83-95, Jun. 2003.

Ekin et al., "Distance-based classification methods", INFOR J. 37(3):337-352, Canada Operation Research Society, Toronto, Canada, 1999; the year of publication is sufficiently earlier than the effective U.S. filing date and any foreign priority date so that the particular month of publication is not in issue.

Han et al., "Automatic Document Metadata Extraction using Support Vector Machines", Proc. 3rd ACM/IEEE-CS Joint Conf on Digital Libraries, Houston TX, p. 37-48, 2003; the year of publication is sufficiently earlier than the effective U.S. filing date and any foreign priority date so that the particular month of publication is not in issue.

IETF, "RFC 2045, Multipurpose Internet Mail Extensions (MIME) Part One: Format of Internet Message Bodies," p. 1-27, Internet Engineering Task Force, Fremont, CA, Nov. 1996.

Kerremans, Towards Ontology-Based E-mail Fraud Detection, Proc. EPIA, Covilha, Portugal, p. 106-111, Dec. 2005.

Lee et al., "Spam Deobfuscation using a Hidden Markov Model", Proc. 2nd Conf. on Email and Anti-Spam, Stanford, CA, Jul. 2005.

MacQueen, "Some methods for classification and analysis of multivariate observations", Proc. 5th Berkeley Symp. on Math. Statist. and Prob., vol. 1, p. 281-297, 1967; the year of publication is sufficiently earlier than the effective U.S. filing date and any foreign priority date so that the particular month of publication is not in issue.

Manco et al., "Towards An Adaptive Mail Classifier", Italian Association for Artificial Intelligence Workshop, Italy, 2002; ; the year of publication is sufficiently earlier than the effective U.S. filing date and any foreign priority date so that the particular month of publication is not in issue.

Mao et al., "Logical Entity Recognition in Multi-Style Document Page Images," Proc.18th Intl. Conf. on Pattern Recognition (ICPR'06) Washington DC, IEEE Society, vol. 01 p. 876-887, Aug. 20-24, 2006.

Miller, "Neural Network-Based Antispam Heuristics," Symantec Enterprise Security white paper, p. 1-8, Symantec, Mountain View, CA, 2003; the year of publication is sufficiently earlier than the effective U.S. filing date and any foreign priority date so that the particular month of publication is not in issue.

Ng et al., "Efficient and Effective Clustering Methods for Spatial Data Mining", Proc. 20th VLDB Conference, Santiago, Chile, pp. 144-155, 1994; the year of publication is sufficiently earlier than the effective U.S. filing date and any foreign priority date so that the particular month of publication is not in issue.

Ristad et al., "Learning string-edit distance", IEEE Trans. Pattern Analysis and Machine Intelligence, 20(5):522-532, IEEE, New York, NY, 1998; the year of publication is sufficiently earlier than the effective U.S. filing date and any foreign priority date so that the particular month of publication is not in issue.

Seidl et al., "Optimal multi-step k-nearest neighbor search", Proc. 1998 ACM SIGMOD Intl. Conf. on Management of Data, Seattle WA, 27(2):154-165, Jun. 1998.

Tan, "Adaptive Resonance Associative Map: A Hierarchical ART System for Fast Stable Associative Learning," IJCNN Conf. on Neural Networks, Baltimore MD, p. I-860-865, Jun. 1992.

Kira et al., "A Practical Approach to Feature Selection," Proc. Ninth Intl. Workshop on Machine Learning, ICML '92, Aberdeen, United Kingdom, Morgan Kaufmann Publishers, Inc., p. 249-256, 1992; the year of publication is sufficiently earlier than the effective U.S. filing date and any foreign priority date so that the particular month of publication is not in issue.

* cited by examiner

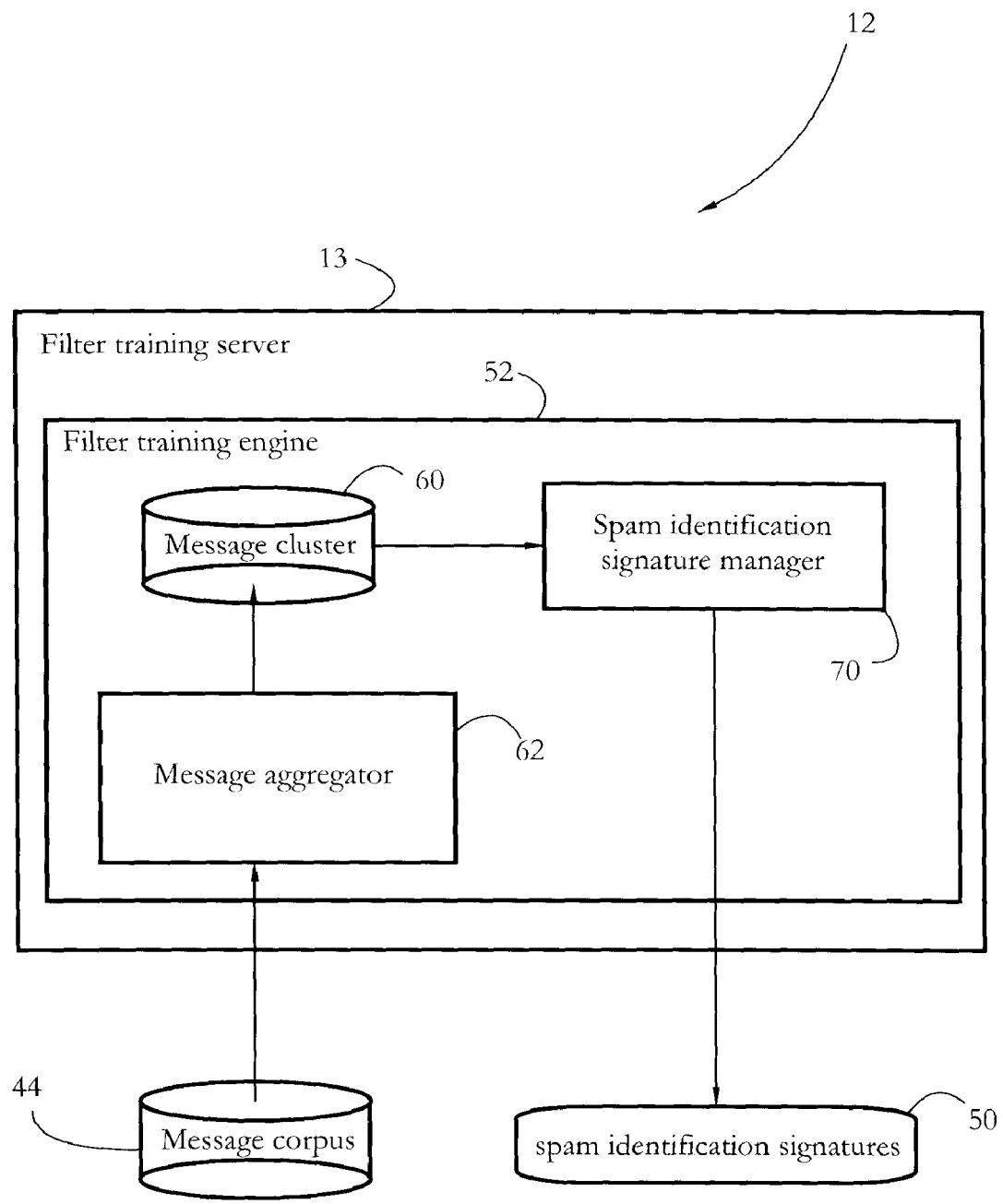
FIG. 3-A

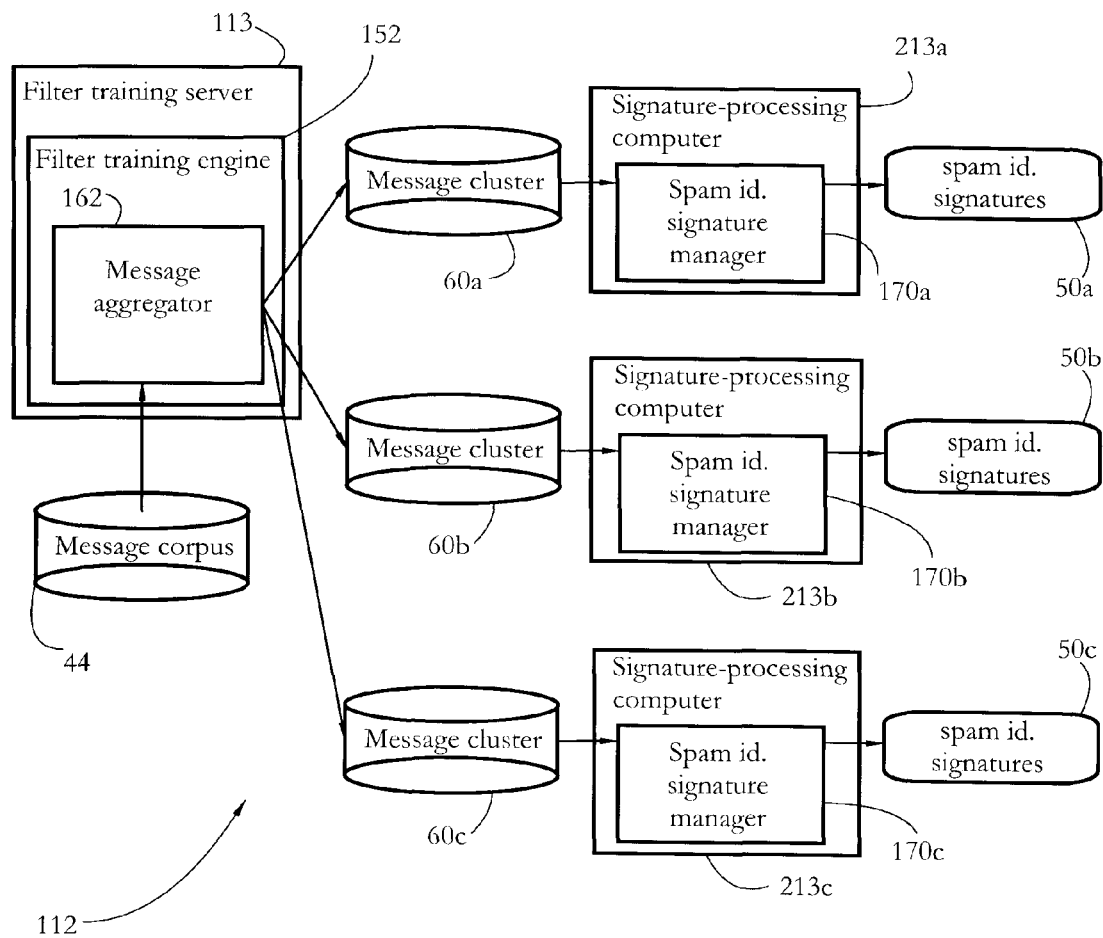
FIG. 3-B

141 {
Message-ID: <44ACAEBC.3080303@servertwo.com>
Date: Thu, 06 Jul 2006 09:33:32 +0300
From: John Doe<john@serverone.com>
To: Jane Doe <jane@servertwo.com>
Subject: Sample MIME message
}

140

142 {
Content-Type: multipart/mixed;
  boundary="------------07030805050106090303030605"
--------------030204060106020509020605

Content-Type: text/plain; charset=ISO-8859-1;
format=flowed; Content-Transfer-Encoding: 7bit
Hi. I thought you would enjoy this:
http://www.serverone.com.
Email me at john@serverone.com.
My photo is attached.

--------------07030805050106090303030605
Content-Type: text/html; charset=ISO-8859-1
Content-Transfer-Encoding: 7bit
<!DOCTYPE html PUBLIC "-//W3C//DTD HTML
4.01 Transitional//EN">
<html>
<head></head>
<body>Hi. I thought you would enjoy this:<br>
<a href= "http://www.serverone.com">Click here
</a><br> Email me at john@serverone.com.<br>
My photo is attached.
<img src="cid:part1.090205@serverone.com">
</body>
</html>

--------------07030805050106090303030605
Content-Type: image/jpeg;
Content-Transfer-Encoding: base64
Content-ID: <part1.090205@serverone.com>
/9j/4AAQSkZJRgABAgEASABIAAD/7RIKUGhvdG9
zaG9wIDMuMAA4QklNA+kAAAAAHgAAwAAAE
--------------07030805050106090303030605--
}

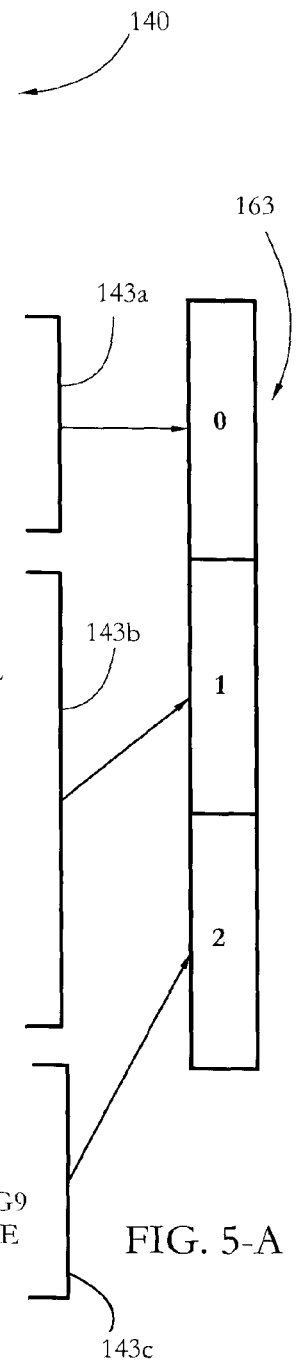

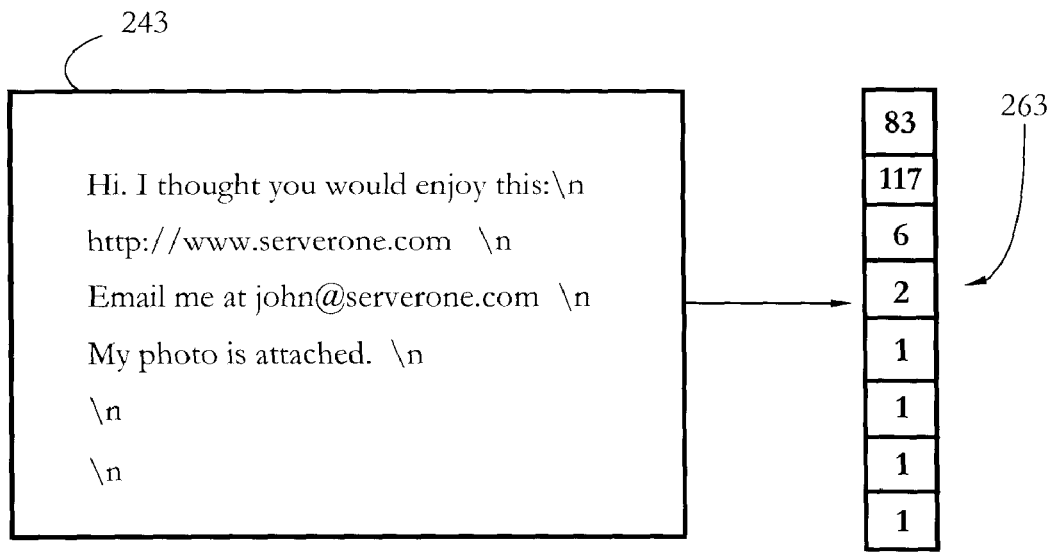
FIG. 5-B
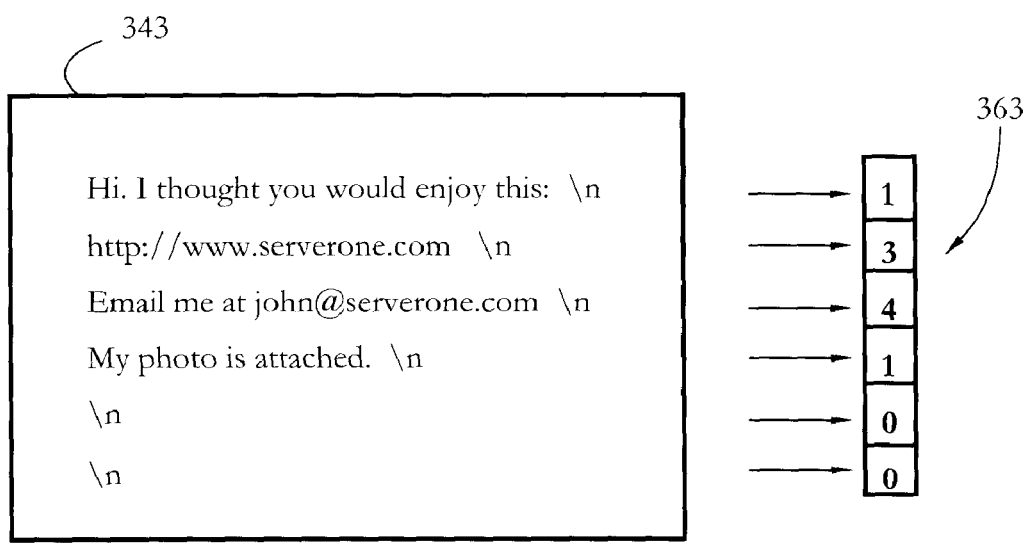
FIG. 5-C

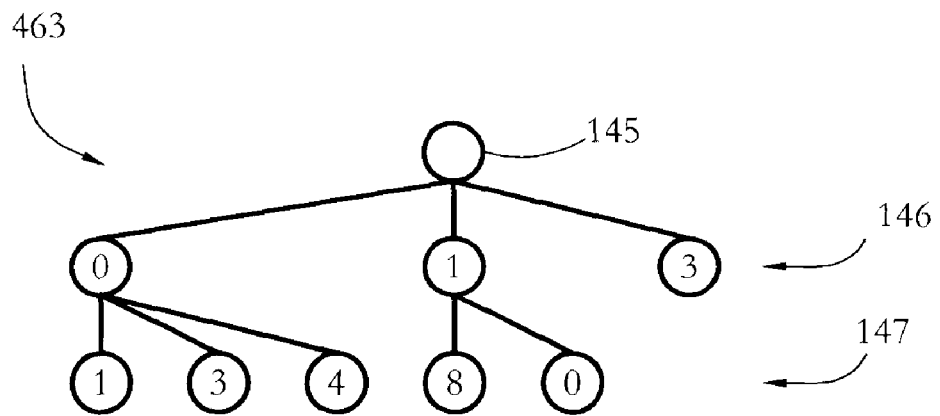
FIG. 5-D
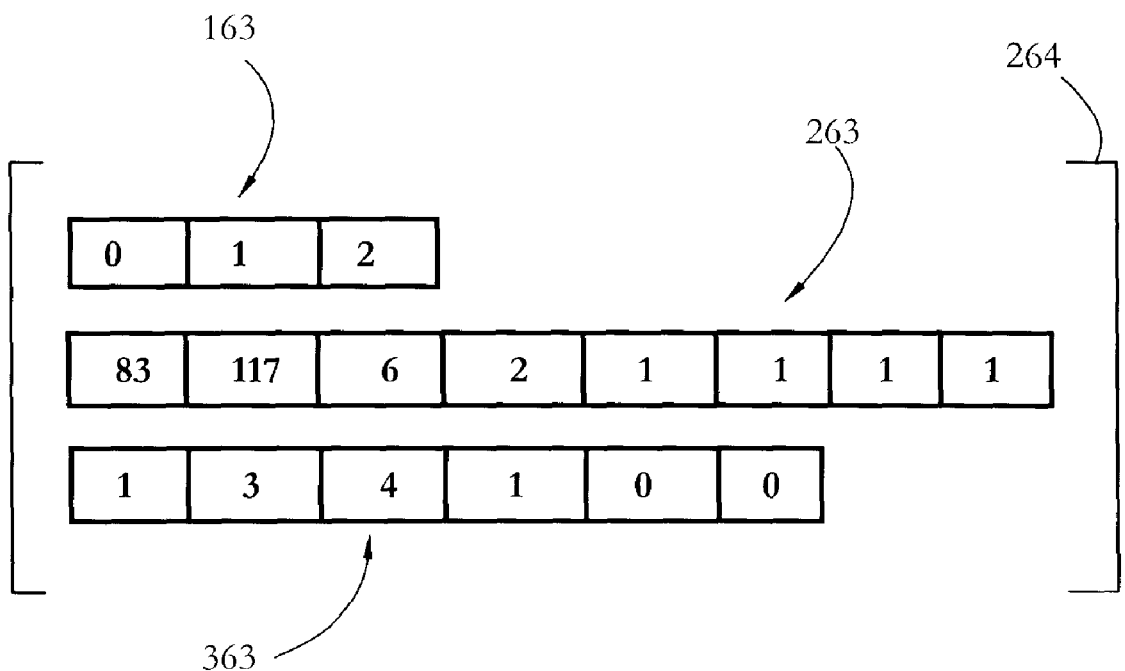
FIG. 5-E

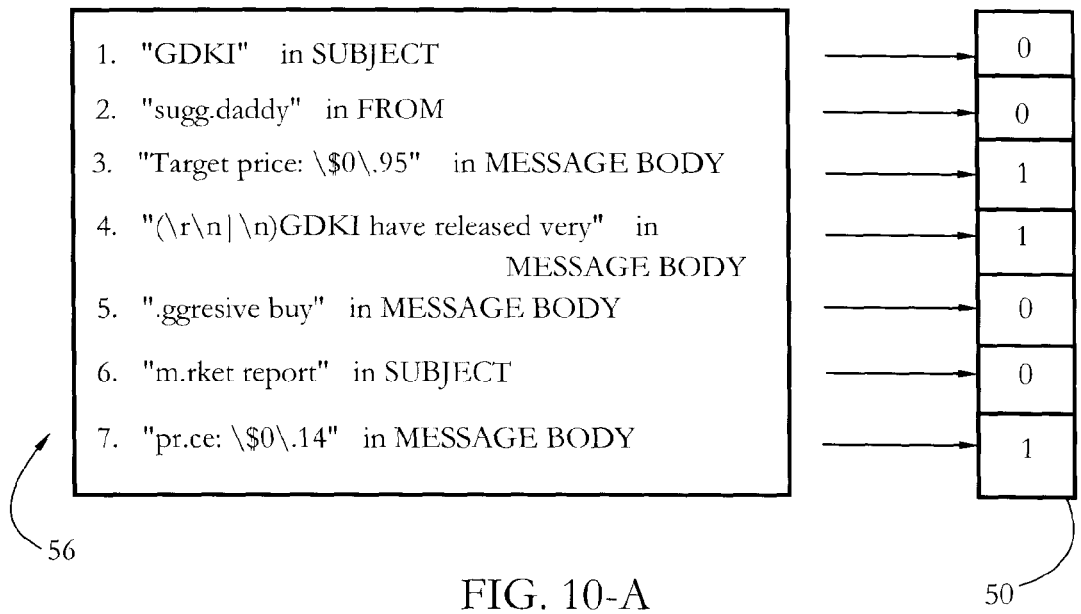
FIG. 10-A
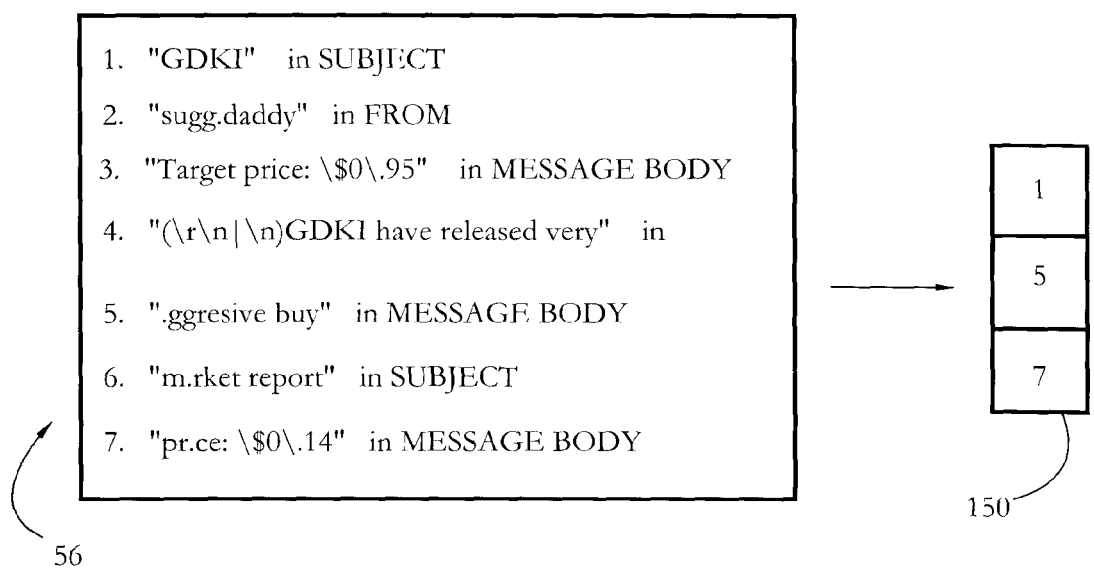
FIG. 10-B

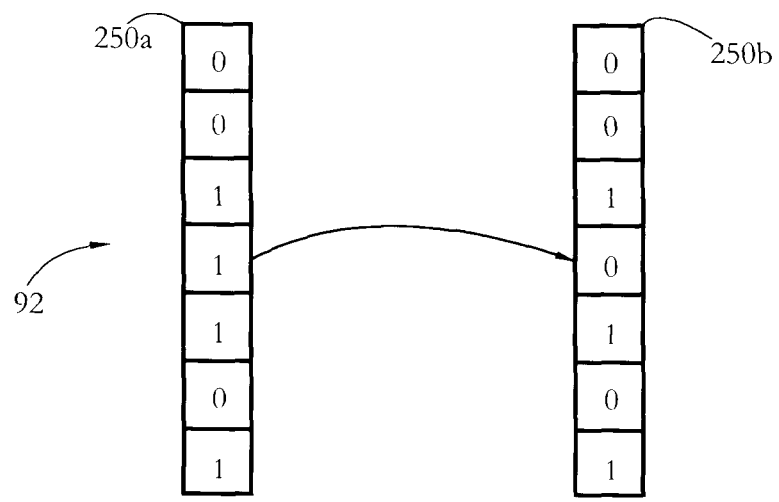
FIG. 12-A
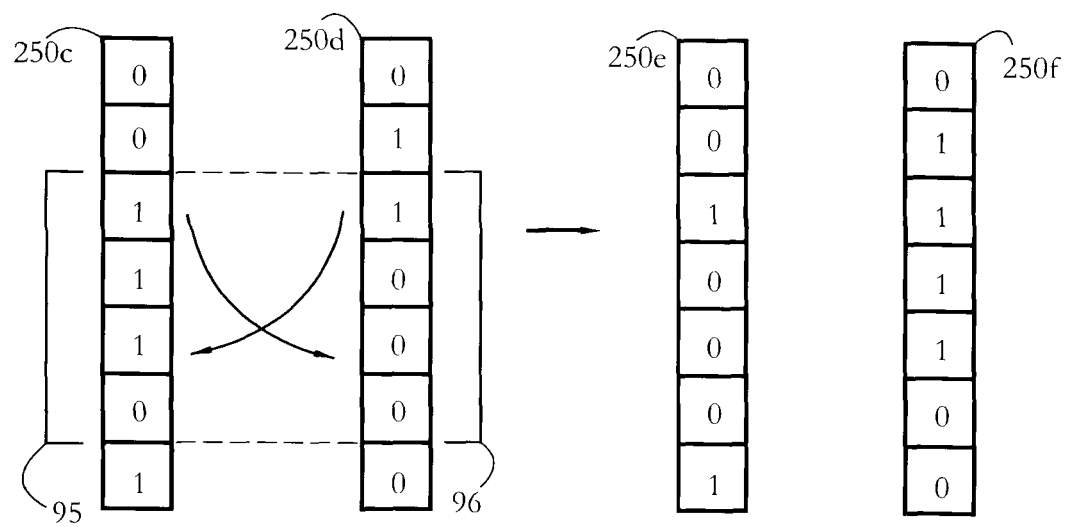
FIG. 12-B

SYSTEMS AND METHODS FOR GENERATING SIGNATURES FOR ELECTRONIC COMMUNICATION CLASSIFICATION

BACKGROUND

The invention relates to methods and systems for classifying electronic communications, and in particular to systems and methods for filtering unsolicited commercial electronic mail (spam).

Unsolicited commercial electronic communications have been placing an increasing burden on the users and infrastructure of electronic mail (email), computer messaging, and phone messaging systems. Unsolicited commercial communications, also known as spam, forms a significant percentage of all email traffic worldwide. Spam takes up valuable network resources, affects office productivity, and is considered annoying, intrusive, and even offensive by many computer users.

Software running on an email user's or email service provider's system may be used to classify email messages as spam or non-spam (also called ham). Current methods of spam identification include matching the message's originating address to lists of known offending or trusted addresses (techniques termed black- and white-listing, respectively), and searching for certain words or word patterns (e.g. refinancing, Viagra®, weight loss).

Spammers constantly develop countermeasures to such anti-spam methods, which include misspelling certain words (e.g. Vlagra), using digital images instead of words, and inserting unrelated text in spam messages (also called Bayes poison). Spam identification may be further complicated by frequent changes in the form and content of spam messages.

To address the ever-changing nature of spam, a message classification system may include components configured to extract characteristic features from newly arrived spam waves, and anti-spam filters configured to classify incoming messages according to these characteristic features. In a common approach, human supervision is employed to define spam identification signatures to be used for classifying incoming messages. Human supervision may allow identifying relatively accurate/effective signatures. At the same time, since spam waves often appear and change rapidly, sometimes within hours or minutes, a responsive human-supervised system may require a significant amount of human labor.

SUMMARY

According to one aspect, a computer-implemented system comprises a message aggregator configured to assign messages of a message corpus to a plurality of message clusters, the plurality of message clusters including a first and a second message cluster; a pattern extractor connected to the message aggregator and configured to extract a first set of cluster-specific spam identification text patterns from members of the first message cluster; and a spam identification signature builder connected to the pattern extractor and configured to combine a first subset of the first set of cluster-specific spam identification text patterns into a first set of spam identification signatures for the first message cluster, wherein each spam identification signature of the first set of spam identification signatures includes at least one spam identification text pattern of the first subset of the first set of cluster-specific spam identification text patterns.

According to another aspect, a computer-implemented method comprises: assigning messages of a message corpus to a plurality of message clusters, the plurality of message clusters including a first and a second message cluster; extracting a first set of cluster-specific spam identification text patterns from members of the first message cluster; and combining a first subset of the first set of cluster-specific spam identification text patterns into a first set of spam identification signatures for the first message cluster, wherein each spam identification signature of the first set of spam identification signatures includes at least one spam identification text pattern of the first subset of the first set of cluster-specific spam identification text patterns.

According to another aspect, a computer-implemented spam-filtering method comprises: receiving a set of cluster-specific spam identification signatures, and deciding whether an incoming message is spam or non-spam according to the cluster-specific spam identification signatures. The cluster-specific spam identification signatures are generated by assigning a message of a message corpus to a selected message cluster of a plurality of message clusters, including a first and second message cluster; extracting a set of cluster-specific spam identification text patterns from members of the first message cluster; and combining a subset of the set of cluster-specific spam identification text patterns into a set of cluster-specific spam identification signatures for the first message cluster, wherein each spam identification signature includes at least one spam identification text pattern.

According to another aspect, a computer-implemented method comprises assigning a document of a document corpus to a selected class of a plurality of classes including a first and a second class, wherein the document is assigned to the selected class according to a set of document layout features, and wherein the document layout features include a set of relative positions of a plurality of metaword structures of the document; extracting a set of class-specific text patterns from members of the first class; and combining the class-specific text patterns into a set of class signatures for the first class, wherein each class signature includes at least one text pattern.

BRIEF DESCRIPTION OF THE DRAWINGS

The foregoing aspects and advantages of the present invention will become better understood upon reading the following detailed description and upon reference to the drawings where:

FIG. 3-A illustrates an exemplary operational diagram of a filter training system of FIG. 1, including a filter training server, according to some embodiments of the present invention.

FIG. 3-B shows an exemplary operational diagram of a filter training system, including a filter training server and a plurality of signature processing computers, according to some embodiments of the present invention.

FIG. 5-A illustrates an exemplary email message and corresponding formatting-part indices according to some embodiments of the present invention.

FIG. 5-B illustrates an exemplary text part of an email message and corresponding layout feature counts according to some embodiments of the present invention.

FIG. 5-C illustrates an exemplary text part of an email message and corresponding line-layout feature indices according to some embodiments of the present invention.

FIG. 5-D shows an exemplary tree representation of a layout feature vector, according to some embodiments of the present invention.

FIG. 5-E illustrates an exemplary layout feature vector in the form of a data structure combining part-layout feature indices, layout feature counts, and line-layout feature indices, according to some embodiments of the present invention.

FIG. 10-A illustrates an exemplary list of selected spam identification text patterns and an exemplary spam identification signature, according to some embodiments of the present invention.

FIG. 10-B shows an exemplary list of selected spam identification text patterns and an alternative formulation of spam identification signature, according to some embodiments of the present invention.

FIG. 12-A shows an exemplary mutation applied to a parent spam identification signature according to some embodiments of the present invention.

FIG. 12-B shows an exemplary crossover recombination applied to a pair of parent spam identification signatures, according to some embodiments of the present invention.

DETAILED DESCRIPTION OF PREFERRED EMBODIMENTS

Figure 1:
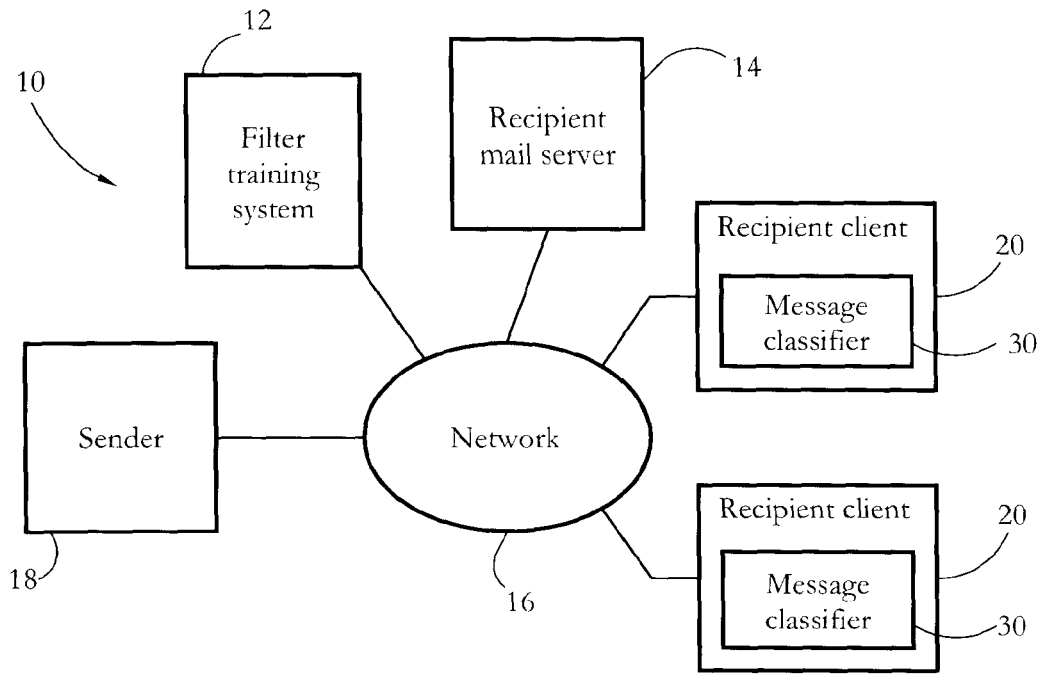
FIG. 1 shows an exemplary electronic communication system including multiple recipient client computers each having a message classifier (e.g. software application) according to some embodiments of the present invention.

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, the term spam is not limited to email spam, but encompasses non-legitimate or unsolicited commercial electronic communications such as email, instant messages, and phone text and multimedia messages, among others. Metaword substructures of a message are substructures of a higher level of abstraction than merely characters or words; examples of metaword substructures include message lines, addresses, hyperlinks, and differently-formatted message parts (e.g. MIME parts). Unless otherwise specified, the term cluster encompasses any class or subclass of a message corpus, and is not limited to messages that are closely-spaced in a feature hyperspace. For clarity and to facilitate antecedent basis management, the term "cluster" is used below to refer to classes used by the filter training system to generate signatures during a training process, and the term "class" is used to refer to classes used by a message classifier which classifies incoming messages. Unless otherwise specified, the term hyperspace encompasses any space having at least two axes. Unless otherwise specified, a list encompasses any ordered concatenation/sequence of indicators; a list may be represented in source code as an array data structure (e.g. an array of characters) or a string data structure, among others. Computer regular expressions are character sequences including special characters, character placeholders, and wildcards (e.g. |, \, ., *, +). Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

FIG. 1 shows an electronic communication and classification system 10 according to some embodiments of the present invention. System 10 may be an electronic mail (email), instant messaging (IM), mobile telephone, or other electronic communication system. For clarity, the following discussion will focus in particular on an electronic mail system. System 10 includes a sender computer system 18, a recipient mail server 14, a filter training system 12, and a plurality of recipient client systems 20. Sender system 18 may include a sender mail server and/or one or more sender client computer systems. Filter training system 12 may include one or more computer systems. A network 16 connects sender system 18, recipient mail server 14, filter training system 12, and recipient client systems 20. Network 16 may be a wide-area network such as the Internet. Parts of network 16, for example a part of network 16 interconnecting recipient client systems 20, may also include a local area network (LAN). In some embodiments, each recipient client system 20 includes a message classifier 30 application, which is used to classify electronic communications as described in detail below. In some embodiments, message classifier 30 may reside on recipient mail server 14, in part or entirely.

An email message sent by sender system 18 to one or more email addresses is received at recipient mail server 14, and then sent or made available otherwise (e.g. through a web interface) to recipient client systems 20.

Figure 2:
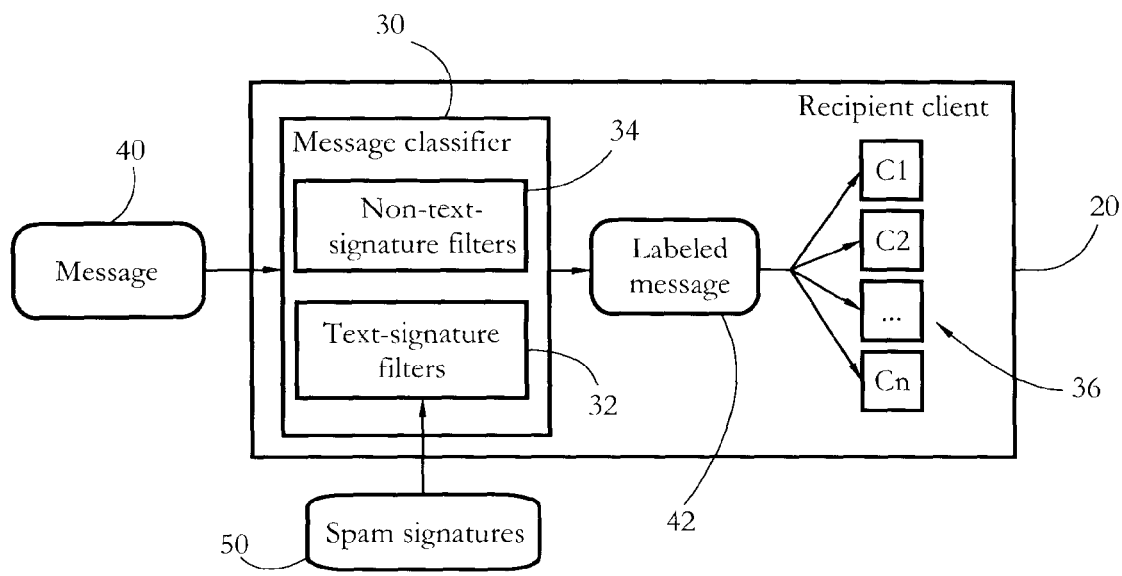
FIG. 2 illustrates the operation of an exemplary message classifier running on a recipient client computer according to some embodiments of the present invention.

FIG. 2 shows an exemplary recipient client system 20 including a message classifier 30, which may be a software program, according to some embodiments of the present invention. In some embodiments, message classifier 30 may be a stand-alone application, or may be an anti-spam module of a security suite having antivirus, firewall, and other modules. Some embodiments of message classifier 30 are integrated within an email application. Message classifier 30 receives an email message 40, and generates a labeled (classified) message 42. Labeled message 42 may include a class label, which may be placed in a header field of labeled message 42. In some embodiments, message classifier 30 may generate a class label and an indicator of an association of the class label to message 40.

Message classifier 30 assigns message 40 to one of a plurality of classes 36 (labeled C1-Cn in FIG. 2). In some embodiments, classes 36 include one or more classes of unsolicited commercial email (spam), and one or more classes of non-spam (legitimate or unknown) email. In a simple embodiment, classes 36 may include spam and non-spam. In some embodiments, classes of legitimate email may include personal and work, while classes of spam may include product offers and phishing, among others. Some embodiments of recipient client system 20 associate classes 36 with individual email folders. A user may interact with message classifier 30 and/or other subsystems of recipient client 20 to manually alter the classification of any message, for example by moving the message from one folder to another.

In some embodiments, message classifier 30 includes a set of text-signature filters 32 and a set of non-text-signature filters 34. Text-signature filters 32 are configured to allow determining whether an incoming message is spam or non-spam according to a comparison between the incoming message and a collection of spam identification signatures 50, described in detail below. In some embodiments, an incoming message may be classified as spam if all elements of at least one spam identification signature 50 are present in the message. In some embodiments, determining whether an incoming message is spam or non-spam may include performing a set of logical operations (e.g. AND, OR) on the elements of at least one spam identification signature 50. For example, if a spam identification signature comprises text patterns (a, b, c, d, e, f), then an incoming message containing the patterns [a AND (b OR c) AND (e OR f)] or [a AND b AND (c OR d OR e OR f)] may be classified as spam. Such a classification approach allows considering variations in spam identification text patterns. Non-text-signature filters 34 are configured to allow determining whether a message is spam or non-spam using techniques other than text signatures. Examples of non-text signature filters 34 may include image analysis filters.

In some embodiments of message classifier 30, anti-spam filters 32, 34 may operate in parallel, in sequence, or in a parallel-sequential configuration. In a parallel configuration, each anti-spam filter may produce a classification score and/or class assignment, and the individual scores may be combined into a global score/class assignment by a decision module. In a sequential configuration, a message may pass through a sequence of anti-spam filters, and its classification score/class assignment may be modified at each step according to the result of each filter.

FIG. 3-A shows an exemplary configuration of filter training system 12 according to some embodiments of the present invention. Filter training system 12 includes a filter training server 13 configured to generate a set of spam identification signatures 50 by analyzing a message corpus 44. In some embodiments, message corpus 44 includes a collection of spam emails sorted and indexed into a number of distinct classes (e.g. investment, Nigerian fraud, adult content, phishing, etc.), as well as a collection of legitimate email messages. Message corpus 44 may be kept up to date by the addition of newly received messages. In some embodiments, message corpus 44 may reside on filter training server 13 or on other computer systems forming part of filter training system 12. Filter training system 12 makes spam identification signatures 50 available to message classifiers 30 residing on recipient clients 20 over network 16 (FIG. 1).

In some embodiments, filter training system 12 includes a filter training engine 52, which may be a software program (FIG. 3-A). Filter training engine 52 includes a message aggregator 62 connected to a spam identification signature manager 70. Message aggregator 62 is configured to input message corpus 44 and to classify corpus 44 into a plurality of message clusters, as described in detail below. Spam identification signature manager 70 inputs each message cluster 60 and generates cluster-specific spam identification signatures 50. In some embodiments, spam identification signature manager 70 processes message clusters 60 in sequence, independently of each other.

FIG. 3-B shows an exemplary embodiment of a filter training system 112 according to some embodiments of the present invention. Filter training system 112 includes a filter training server 113 connected to a plurality of signature processing computer systems 213a-c. In some embodiments, each signature processing computer system 213a-c may be an individual processing unit of a parallel multi-processor computer system. Filter training server 113 includes a filter training engine 152, which may be a software program. In some embodiments, each signature processing computer system 213a-c includes a spam identification signature manager 170a-c, which may be a software program. Filter training engine 152 includes a message aggregator 162 configured to input message corpus 44 and to classify corpus 44 into a plurality of message clusters 160a-c. Filter training engine 152 is further configured to send each message cluster 160a-c to an individual signature processing computer system 213a-c. In some embodiments, each spam identification signature manager 170a-c inputs an individual message cluster 160a-c and generates a cluster-specific spam identification signature set 50a-c, respectively.

Figure 4:
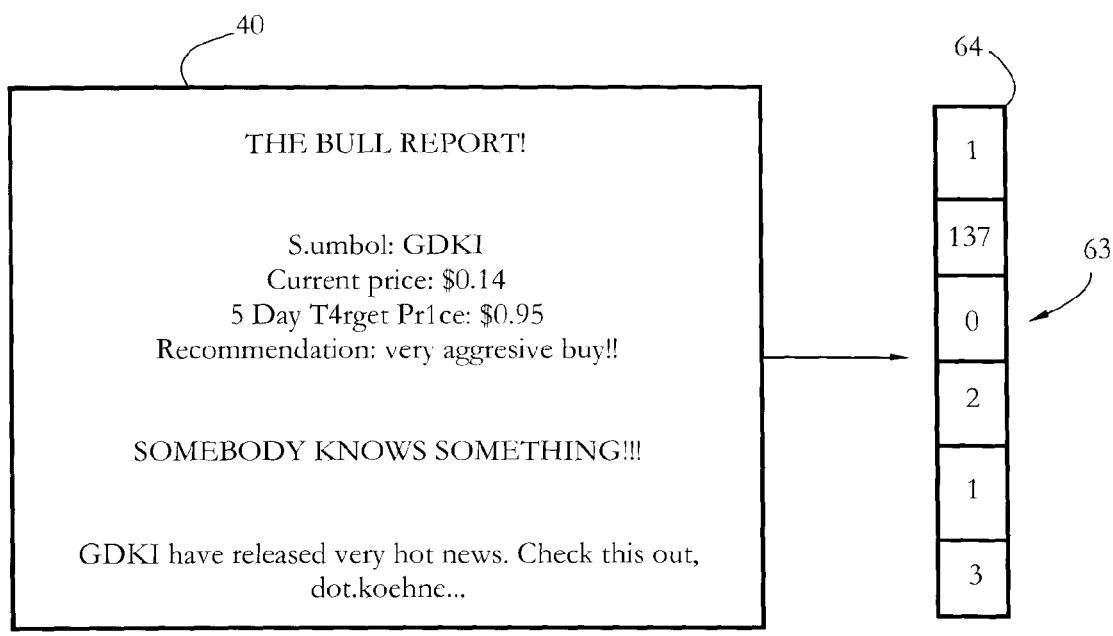
FIG. 4 shows an exemplary email message and a corresponding set of layout features forming a layout feature vector according to some embodiments of the present invention.

In some embodiments, message aggregator 62 (FIG. 3-A) and/or 162 (FIG. 3-B) are configured to classify a corpus of email messages into a plurality of message clusters (classes). Exemplary embodiments of a message cluster may include a subset of all spam messages, such as a collection of messages belonging to an individual spam wave, or a subset of non-spam messages, or a collection including both spam and non-spam messages. Each cluster contains only messages sharing a set of common features. Exemplary message clustering criteria may include the presence or absence of Bayes poison (random legitimate words) within a message, or grouping messages according to similarities in the types and/or the order of fields within the message header. Some embodiments of message aggregator 62 and/or 162 are configured to classify an email corpus according to message layout, as defined by a set of layout features. A subset of layout features corresponding to an email message 40 forms a layout feature vector of the respective message. FIG. 4 shows an exemplary email message 40, and a corresponding layout feature vector 64 including a set of corresponding message layout feature indices (labels) 63. In some embodiments, layout feature vector 64 may describe the positions of differently-formatted parts of the message (e.g., MIME parts), the absolute and/or relative positions of metaword message features including text features (e.g. short lines, long lines, blank lines, website links, and email addresses), as well as various layout feature counts (number of blank lines, hyperlinks, email addresses), as described in detail below. Message layout features and layout feature vectors can be understood better by considering an exemplary email message.

In some embodiments, layout feature vector 64 includes a set of formatting-part indices. FIG. 5-A shows a raw/source view of an exemplary email message 140 and a set of corresponding formatting-part indices 163. Message 140 includes a header 141 and a message body 142. Header 141 may include fields denoting the message's path, sender, recipient, and date, among others. Message body 142 contains multiple differently-formatted parts (e.g. MIME parts): a plain-text part 143*a*, an HTML part 143*b*, and an image part 143*c*. Distinct MIME parts are separated by formatting-part boundary markers. In some embodiments, message aggregator 62 (FIG. 3-A) identifies various formatting parts 143*a-c* within incoming message 140, and arranges indices representing formatting parts 143*a-c* in an ordered list. In some embodiments, every formatting part receives an index/label 163 (e.g. 0 for plain text, 1 for HTML, 2 for image/jpeg, etc.). In some embodiments, the number of indices 163 in a layout feature vector is message-dependent.

In some embodiments, layout feature vector 64 includes a set of layout feature counts. FIG. 5-B shows an exemplary body 243 of a text part of a message, and a set of corresponding layout feature counts 263. In an exemplary embodiment, layout feature counts 263 may include a message size (13 kB for the example in FIG. 5-B), total number of characters (117), total number of new lines (6), blank lines (2), website links (1), email addresses (1), images (1), or attached files (1). In some embodiments, the number of layout feature counts 263 is message-independent.

In some embodiments, layout feature vector 64 includes a set of line-layout feature indices. FIG. 5-C shows an exemplary body 343 of a text part of a message, and a set of corresponding line-layout feature indices 363. In some embodiments, line-layout feature indices 363 include an ordered list of values representing the line structure of the message. In the example of FIG. 5-C, the list of line-layout features indices 363 has a value 134100, wherein the number 1 signifies a short line ("Hi. I thought you would enjoy this:"), the number 3 signifies a hyperlink ("http://www.serverone.com/"), the number 4 denotes an email address ("john@serverone.com"), and the number 0 denotes a blank line. In general, different messages may have corresponding line-layout feature index lists of different lengths. Depending on the communication protocol, the body of the text part of the message may not contain explicit line breaks (denoted by the character '\n' in FIG. 5-C), in which case such line breaks may be generated by a subsystem of message aggregator 62. Line breaks may be generated by creating individual lines having a fixed number of characters (e.g. 72 or 80) prior to analyzing the line-layout of the message. In some embodiments, message aggregator 62 may use additional formatting information stored in an HTML-part of the message, if available, to decide upon the line-layout of the message.

In some embodiments, one or more components of layout feature vector 64 may be organized as a tree structure. FIG. 5-D shows an exemplary tree structure layout representation 463 including a root node 145, a set of first level nodes 146, and a set of second level nodes 147. In some embodiments, root node 145 represents message 40, while first level nodes 146 represent formatting (e.g. MIME) parts of the message. Second- and higher-level nodes may represent message formatting parts, message lines, and/or other metaword substructures. Each node in the tree structures includes an identifier of its corresponding structure. For example, for the message shown in FIG. 5-A, the first-level nodes 146 may hold the values 0, 1, 2, respectively, corresponding to plain text, html, and image MIME parts. In some embodiments, tree structure layout representation 463 may include fewer or more levels than shown in FIG. 5-D, and fewer or more nodes at each level.

In some embodiments, layout feature vector 64 may include a heterogeneous data structure. FIG. 5-E shows an exemplary layout feature structure 260 comprising three data fields represented by the three row vectors of FIG. 5-E. The first row comprises formatting part indices 163 of FIG. 5-A, the second row comprises layout feature counts 263 of FIG. 5-B, while the third row contains line layout feature indices 363 of FIG. 5-C. In some embodiments, the number and ordering of data fields, as well as the number of elements in each data field, may vary from the ones described above. In some embodiments, the number of elements in each data field may be message-dependent.

In some embodiments, messages are aggregated into message clusters using distances determined in a layout hyperspace constructed using layout feature vectors 64. In particular, clusters may be defined according to hyperspace distances between the layout vector 64 of a each message and a set of representative layout vectors defining different message clusters.

Figure 6:
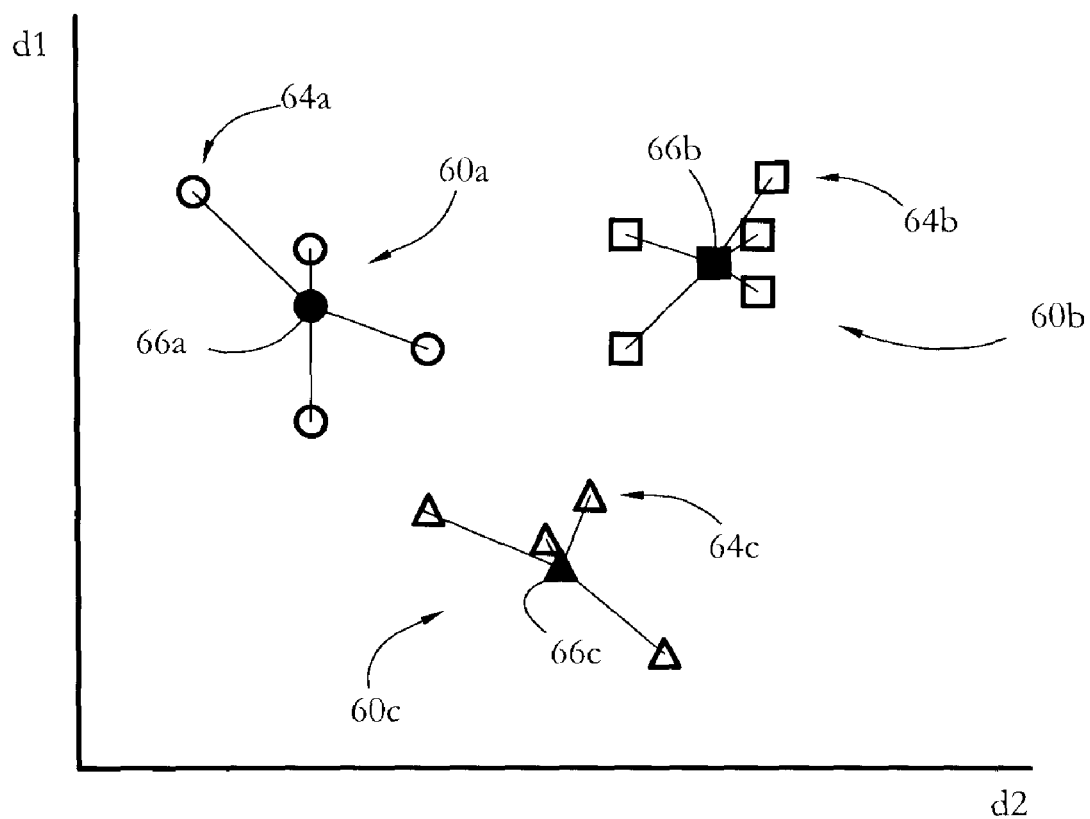
FIG. 6 illustrates an exemplary set of three message clusters in a 2-D message layout space according to some embodiments of the present invention.

FIG. 6 shows three exemplary message clusters 60*a-c* formed by layout feature vectors 64*a-c*, respectively, in a simple 2-D layout hyperspace having two axes, d1 and d2. Clusters 60*a-c* define corresponding cluster centroids 66*a-c*, which can be used as representative vectors for the corresponding clusters. Each centroid 66*a-c* is a layout vector characterized by the shortest total distance (smallest distance sum) to all the members of its corresponding cluster 60*a-c*. Centroids 66*a-c* can be thought of as the centers of clusters 60*a-c*. Some embodiments of message aggregator 62 may assign a message to the cluster whose centroid is the shortest distance away from the layout vector 64 corresponding to the message. In some embodiments, clustering in layout hyperspace may be performed using a k-means method in conjunction with a k-medoids method. In some embodiments, distances in layout hyperspace may be computed as Euclidean distances or Manhattan distances, or combinations thereof. In an embodiment which uses tree-representations of layout feature vectors (FIG. 5-D), a distance between two trees may be defined as the edit distance between the trees, i.e. a minimum cost to transform one tree into the other using elementary operations such as substitution, insertion, and deletion. In some embodiments, an inter-tree edit distance may be determined using a Zhang-Shasha or Klein algorithm.

Figure 7:
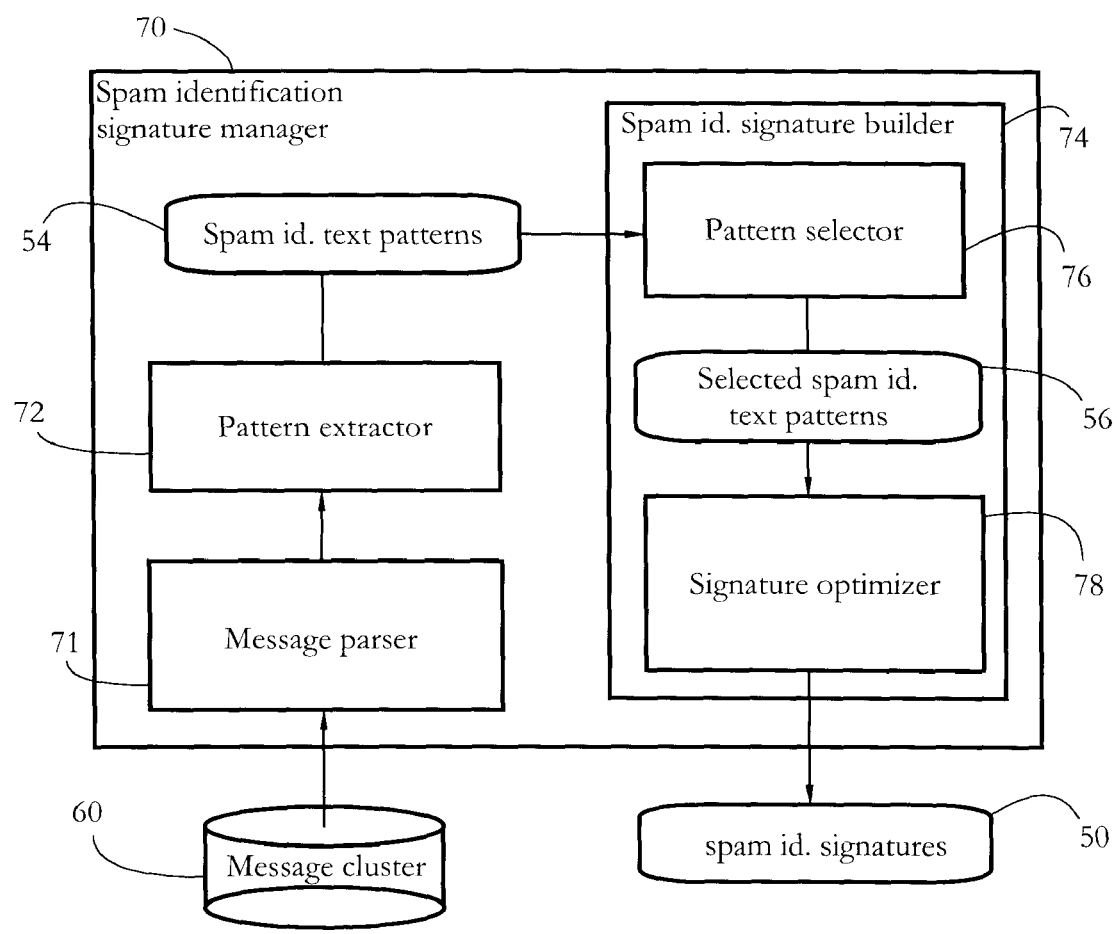
FIG. 7 shows an exemplary internal diagram of a spam identification signature manager according to some embodiments of the present invention.

FIG. 7 shows an exemplary diagram of a spam identification signature manager 70 according to some embodiments of the present invention. Spam identification signature manager 70 includes a message parser 71, a pattern extractor 72 connected to message parser 71, and a spam identification signature builder 74 connected to pattern extractor 72. Spam identification signature manager 70 receives each message cluster 60 and outputs a set of cluster-specific spam identification signatures 50 for each cluster 60.

In some embodiments, message parser 71 inputs a message 40 from message cluster 60 and processes message 40 into a form suitable for pattern extractor 72. For example, message parser 71 may break up message 40 into formatting (e.g. MIME) parts, and/or may extract information from the message header (e.g., return the message ID, sender, and subject fields of an email message). In some embodiments, message parser 71 may remove formatting information such as HTML tags from the body of message 40. In some embodiments, message parser 71 may concatenate all or a subset of the messages of message cluster 60 into a single character string, and may or may not introduce a delimiting character between individual messages.

Figure 8:
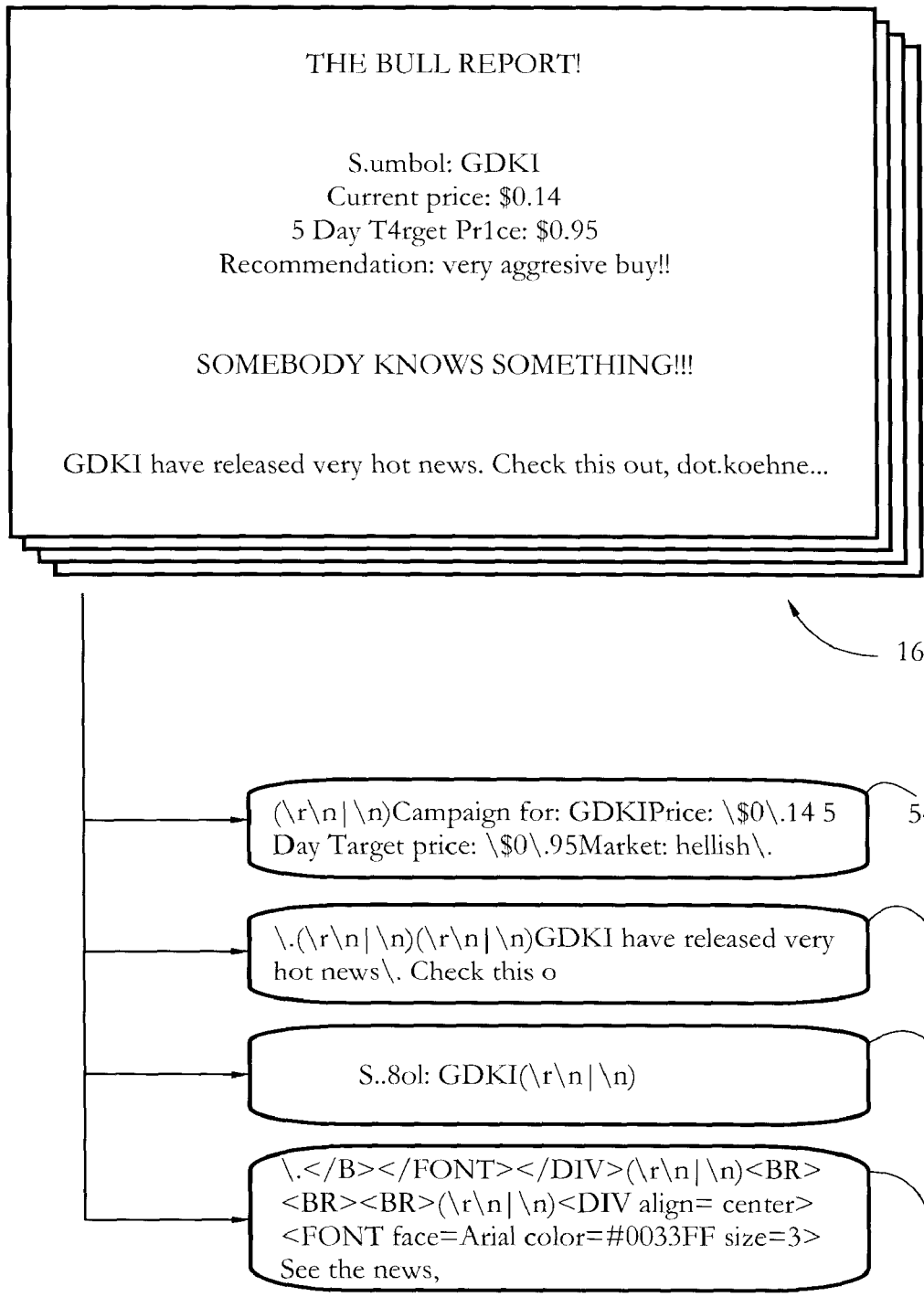
FIG. 8 shows an exemplary message cluster and a corresponding set of spam identification text patterns, according to some embodiments of the present invention.

Pattern extractor 72 receives a parsed version of message 40 from message parser 71 and produces a set of cluster-specific spam identification text patterns 54. Some embodiments of pattern extractor 72 may input message 40 in raw (unparsed) form. FIG. 8 illustrates an exemplary message cluster 160 and a corresponding set of spam identification text patterns 54a-d. In some embodiments, spam identification text patterns 54 are character strings which are common to a collection of spam messages. Examples of spam identification text patterns 54 include "Viagra", "buy", and various stock symbols (e.g., "GDKI" in FIG. 8). In some embodiments, spam identification text patterns 54 may comprise computer regular expressions (e.g., "V.agra", wherein "." may represent any character).

Some embodiments of pattern extractor 72 are configured to extract a set of spam identification text patterns 54, each occurring at least K times within the message cluster 60. Choosing a value of K may be performed by evaluating a trade-off between spam sensitivity and specificity, with higher K values generally yielding an increase in false positives, and lower K values leading to a decrease in the spam detection rate. Higher K values generally correspond to relatively more common text features, that are present in a higher fraction of messages but may not be optimal in selectively identifying spam. Lower K values generally correspond to less common features, which may be more effective in selectively identifying spam, but are present in a smaller fraction of messages. In some embodiments, a K value on the order of about 70% of the number of messages in the message cluster was chosen according to empirical observation. To compute spam identification text patterns 54, an exemplary pattern extractor 72 may use a string search algorithm such as the Teiresias algorithm (I. Rigoutsos and A. Floratos, Combinatorial pattern discovery in biological sequences: The TEIRESIAS algorithm, Bioinformatics 1998, vol. 14, pp. 55-67).

Figure 9:
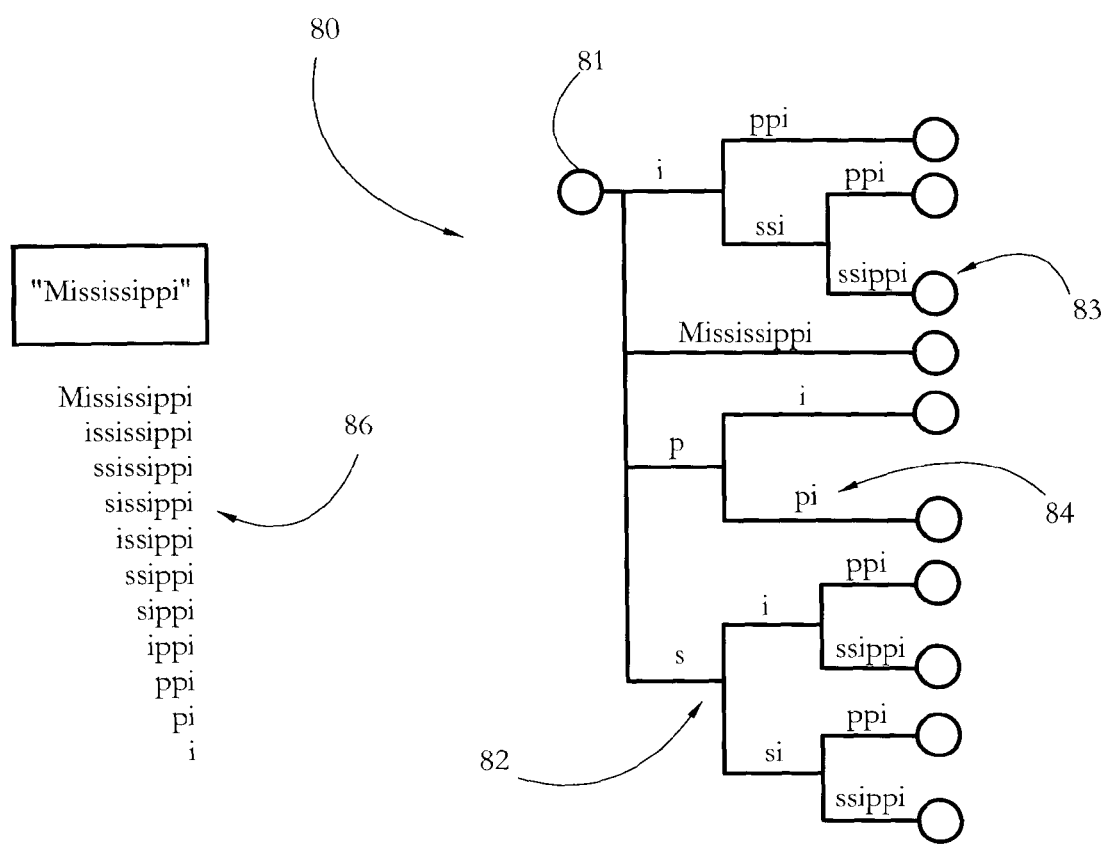
FIG. 9 illustrates an exemplary suffix tree representation of a word, according to some embodiments of the present invention.

Some embodiments of pattern extractor 72 are configured to compute a suffix-tree representation of a message 40 or of a section of message 40 as part of the string search computation. In some embodiments, pattern extractor 72 may compute the suffix tree of a cluster-specific character string obtained by concatenating a set of messages and/or sections of messages belonging to message cluster 60. FIG. 9 shows an exemplary character sequence ("Mississippi"), a corresponding set of suffixes 86, and a corresponding suffix tree 80. Suffix tree 80 comprises a root 81, a set of internal nodes 82, a set of terminal nodes 83, and a set of edges 84. In some embodiments, suffix tree 80 is constructed so that each internal node 82 has at least two children edges 84 and each edge 84 is labeled with a nonempty substring of the analyzed character string. No two edges 84 out of an internal node 82 can have edge labels beginning with the same character. The concatenation of edge labels on the path from root 81 to every terminal node 83 enumerates all suffixes 86 of the analyzed string. For an example of a string search algorithm employing suffix trees, see J. Vilo, *Pattern Discovery from Biosequences*, Ph. D. thesis, Department of Computer Science, University of Helsinki (2002), ISBN952-10-0792-3.

In some embodiments, the length of spam identification text patterns 54 may be bounded between predefined limits $L_{min}$ and $L_{max}$. For example, in some embodiments the extracted text patterns may be between 10 and 20 characters long. In an embodiment using suffix trees as part of the string search algorithm, limiting the length of spam identification text patterns 54 to between $L_{min}$ and $L_{max}$ characters may comprise computing $L_{max}$ levels of the suffix tree corresponding to the analyzed character string. In the example of FIG. 9, suffix tree 80 has three levels of edges 84 between root 81 and terminal nodes 83.

In some embodiments, spam identification signature builder 74 (FIG. 7) receives cluster-specific spam identification text patterns 54 for a cluster and produces cluster-specific spam identification signatures 50 for the cluster. Spam identification signature builder 74 includes a pattern selector 76 and a signature optimizer 78 connected to pattern selector 76.

Pattern selector 76 inputs spam identification text patterns 54 and produces a set of selected spam identification text patterns 56. In some embodiments, selected spam identification text patterns 56 comprise a subset of spam identification text patterns 54 selected according to a relevance score. An exemplary embodiment of pattern selector 76 may use a variant of the Relief algorithm (e.g. K. Kira and L. A. Rendell, A practical approach to feature selection. *Machine Learning: Proceedings of International Conference ICML '92*, Aberdeen 1992, pp. 249-256) to compute the relevance of each spam identification text pattern 54, in the following manner. A collection of N sample messages is gathered, including members of a plurality of message classes (e.g. both spam and non-spam). In some embodiments, the collection of sample messages may be a subset of message corpus 44. Each message j (j=1, 2, ..., N) of the collection of sample messages may be represented in an M-dimensional pattern hyperspace by a vector $x^j = (x_1^j, x_2^j, \ldots, x_M^j)$, wherein M is the number of spam identification text patterns 54 whose relevance is calculated, and $x_i^j = 1$ or 0, depending on whether spam identification text pattern i is present or not in the j-th sample message, respectively. In some embodiments, a relevance score for spam identification text pattern i may be computed according to the formula:

$$R_i = \frac{\sum_{j=1}^{N} \sum_{k=1}^{n} |x_i^j - M_i^{j,k}|}{\sum_{j=1}^{N} \sum_{k=1}^{n} |x_i^j - H_i^{j,k}|},$$

wherein $H_i^{j,k}$ (k=1, 2, ..., n) are the i-th coordinates of the n sample messages of the collection which are closest in pattern hyperspace to message j and belong to the same class of messages (e.g., spam) as message j, while $M_i^{j,k}$ (k=1, 2, ..., n) are the i-th coordinates of the n sample messages of the collection which are closest in pattern hyperspace to message j, but belong to a different message class than message j. In some embodiments, a value of n between 12 and 15 may be chosen to provide a desired trade-off between computation speed and spam detection sensitivity/selectivity.

In some embodiments, the pattern hyperspace used by pattern selector 76 may include a plurality of dimensions defined by spam features other than the spam identification text patterns 54 computed by pattern extractor 72. For example, a set of spam identification text patterns determined by other methods and/or at other times may be included, as well as other spam heuristics not related to spam identification text patterns (e.g., blacklisted sender, selected message layout features).

Some embodiments of pattern selector 76 may select spam identification text patterns 54 with relevance scores $R_i$ in excess of a predefined threshold to form selected spam identification text patterns 56. In alternative embodiments, selected spam identification text patterns 56 comprise the $N_s$ most relevant spam identification text patterns 54.

In some embodiments, spam identification signature builder 74 (FIG. 7) may combine a subset of selected spam identification text patterns 56 for a cluster to form a set of spam identification signatures 50 for the cluster. FIG. 10-A shows an exemplary ordered list of selected spam identification text patterns 56, and an exemplary spam identification signature 50, according to some embodiments of the present invention. In some embodiments, spam identification signature 50 is a binary list of elements, wherein each element i has a value of 1 or 0, depending on whether selected spam identification text pattern i is present or not in spam identification signature 50, respectively. In FIG. 10-A, spam identification signature (0,0,1,1,0,0,1) may signify the simultaneous presence within a message of the third, fourth, and seventh pattern from the list of selected spam identification text patterns 56. In some embodiments, the length of spam identification signature 50 is equal to the number of selected spam identification text patterns 56. Some embodiments may add to the list of selected spam identification text patterns 56 a set of other spam identification criteria, such as a set of spam identification text patterns determined by other methods or during previous operations of filter training engine 52, or a subset of message layout features 63.

FIG. 10-B shows an alternative embodiment 150 of a spam identification signature. Spam identification signature 150 is a list of labels, addresses or pointers to individual selected spam identification text patterns 56. In FIG. 10-B, spam identification signature (1,5,7) may signify the simultaneous presence of the first, fifth, and seventh pattern from the list of selected spam identification text patterns 56. In some embodiments, the length of spam identification signatures 150 may vary between signatures. In some embodiments, some spam identification signatures may consist of a single selected spam identification text pattern 56.

Figure 11:
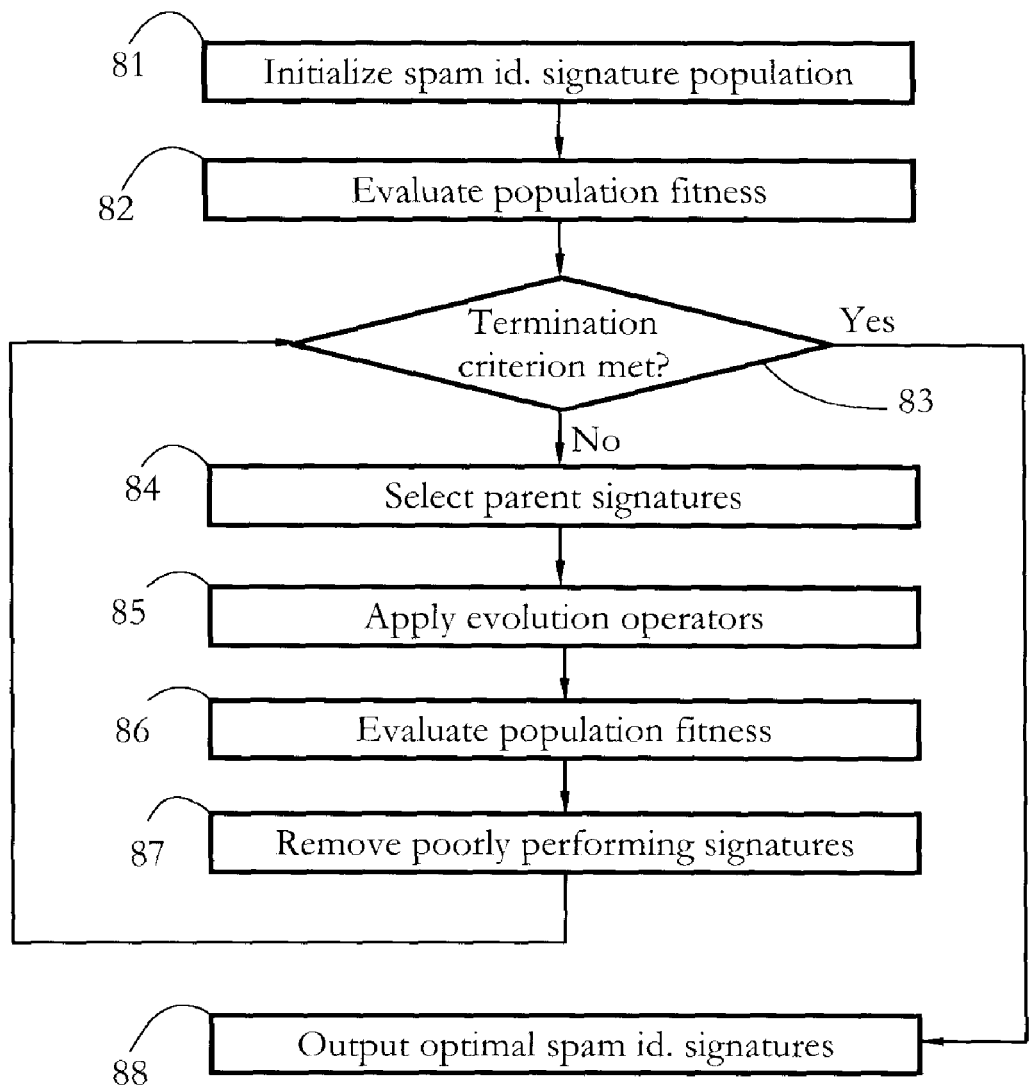
FIG. 11 shows an exemplary sequence of steps performed by the signature optimizer of FIG. 7 according to some embodiments of the present invention.

Some embodiments of signature optimizer 78 (FIG. 7) may use a genetic algorithm to produce an optimal set of spam identification signatures 50. FIG. 11 illustrates an exemplary sequence of steps followed by signature optimizer 78. In a step 81, signature optimizer 78 creates an initial signature population, comprising $N_p$ distinct spam identification signatures 50. In some embodiments, the relevance score $R_i$ computed by pattern selector 76 is used to separate selected spam identification text patterns 56 into two groups: a first group containing $N_1$ spam identification text patterns with the highest relevance scores, and a second group containing the rest of the selected spam identification text patterns 56. In some embodiments, each selected spam identification text pattern 56 in the first group produces an individual spam identification signature 50. Members of the second group are randomly combined to form $N_p$-$N_1$ spam identification signatures 50. Spam identification signatures 50 generated by the first and second group form the initial signature population. In some embodiments, spam identification signatures 50 forming the initial signature population may include elements other than selected spam identification text patterns 56 (for example, spam identification text patterns determined during a previous operation of filter training engine 52, or other spam heuristics). In some embodiments, spam identification signatures 50 participating in signature optimization may include a set of message layout features.

In a step 82, signature optimizer 78 may evaluate the population fitness by calculating a spam identification effectiveness of each member of the initial signature population. In some embodiments, the spam identification effectiveness of each spam identification signature 50 is computed according to a true-positive, false-positive, and false-negative spam detection rate of the respective signature, or a combination thereof, evaluated on a training collection of messages including both spam and non-spam messages. For example, the spam identification effectiveness of spam signature i may be computed according to the formula:

$$E_i = \frac{P_i^T - \alpha \cdot P_i^F}{100},$$

wherein $P_i^T$ is the true-positive spam detection rate of signature i (percentage of spam messages containing signature i), $P_i^F$ is the false-positive spam detection rate of signature i (percentage of non-spam messages containing signature i), respectively, and wherein α is a positive parameter. Formula [2] may yield effectiveness values $E_i$ between −α and 1. In some embodiments, a may be chosen to be between 10 and 30, for example about 20, i.e. a false positive may be considered 20 times more important than a correct spam detection. In some embodiments, the training collection may comprise a subset of message corpus 44. Step 82 may further include a ranking of the initial signature population according to spam identification effectiveness.

In a step 83, signature optimizer 78 tests whether a termination criterion for optimization is met. In some embodiments, the termination criterion may be that a predefined number of optimization cycles is completed, or that a predefined mean or median spam detecting performance of the signature population is attained. Signature optimizer 78 proceeds to step 88 or to step 84, depending on whether the termination criterion is or is not met, respectively.

In a step 84, a subset of parent signatures is selected from the signature population, to participate in evolution operations. In some embodiments, the parent signatures are selected randomly. Some embodiments of signature optimizer 78 may select parent signatures with a probability which varies according to the spam identification effectiveness of the respective signatures (e.g. in some embodiments, only signatures with spam detecting performance $P_i>0$ may be selected as parent signatures). The number of evolution operations and the corresponding number of parent signatures may be predefined, and may vary with each optimization cycle 83-87.

In a step 85, signature optimizer 78 applies a set of evolution operations to the set of parent signatures. In some embodiments, evolution operations include mutations and crossover recombinations. FIG. 12-A illustrates an exemplary mutation 92 transforming a parent signature 250*a* into a child signature 250*b*. In some embodiments, mutation 92 comprises changing a set of elements of parent signature 250*a*. In an embodiment which uses variable-length parent signatures, mutations 92 may include appending a set of elements to and/or removing a set of elements from a parent signature. FIG. 12-B illustrates a crossover recombination 94 of a pair of parent signatures 250*c*-*d* into a pair of child signatures 250*e*-*f*. In some embodiments, crossover recombination 94 comprises exchanging a first subsequence 95 of elements of a first parent signature with a second subsequence 96 of a second parent signature. In some embodiments, child signatures resulting from evolution operations are added to the current signature population.

In a step 86, signature optimizer 78 evaluates the fitness of the current signature population, by calculating the spam detecting performance of each signature 50. In some embodiments, step 86 may use the methods described under step 82 to calculate the population fitness.

In a step 87, signature optimizer 78 may remove a subset of signatures 50 from the signature population. In some embodiments, signatures 50 whose spam detecting performance is below a predetermined threshold are discarded. Alternative embodiments may remove signatures with the lowest spam detecting performance, so that the size of the signature population stays the same ($N_p$) as that of the initial signature population selected in step 81.

In a step 88, signature optimizer 78 outputs a set of spam identification signatures 50 selected from the signature population upon completion of the signature optimization process. In some embodiments, signature optimizer 78 may output a predefined number of signatures 50 with the highest spam detecting performance, or all signatures 50 with spam detecting performance in excess of a predetermined threshold (for example, all signatures 50 with false-positive rate less than 1% and true positive rate larger than 97%). In some embodiments, signature optimizer 78 may produce on the order of 2-3 spam identification signatures per message cluster.

The exemplary systems and methods described above enable the automatic construction of spam identification signatures which allow a classification system such as an anti-spam filter to classify new messages into a plurality of classes (e.g. spam and non-spam).

An alternative embodiment of the systems and methods described above may be used to automatically construct class-specific signatures which allow a document classification system to classify new documents into a plurality of classes (e.g., letters, invoices, faxes, product adverts).

Computer-based detection of text patterns may place a heavy burden on computing infrastructure, both in terms of storage and processing speed requirements. The continuously changing nature of spam may be efficiently addressed by pre-classifying a message corpus into a number of distinct message clusters and extracting specific text patterns from each cluster. An exemplary message cluster may be an individual spam wave.

The content of spam may undergo changes even on the time scale of a single day (e.g. within hours or even minutes), but the layout of certain classes of messages is sometimes preserved. Illustratively, legitimate email messages may come predominantly in letter-like form, while advertising messages may tend to use unusual graphic layouts to attract attention. Layout feature vectors defined for such messages may be situated relatively far apart in the layout feature space, and thus would be assigned to different layout clusters. The layout clustering may evolve over time, as relevant layout features of email messages change.

Automatically extracted patterns may contain character strings which are not related to spam, but occur frequently in all electronic messages. Examples of such common patterns are "www", "email", as well as common words such as "and", emoticons such as ":-)" and colloquial abbreviations such as "OMG" and "lol". A pattern selection step serves to select a subset of patterns which are relevant to spam detection.

The spam-detecting performance of individual spam identification text patterns may be increased by grouping such patterns together into spam identification signatures. The text pattern composition of such signatures may be further optimized to produce a set of high-performance spam identification signatures which are representative for a given message cluster (e.g. spam wave).

To illustrate the operation of an exemplary message classification system, a simulation was conducted using incoming email received at a corporate server. A typical daily inflow of 0.8 million messages was filtered using an existing anti-spam solution, resulting in approximately 50,000 undetected spam messages. Approximately 25% of these messages were image spam, and were discarded. Several hourly quotas of spam were selected and a pool of legitimate messages (ham) was added to each hourly quota, thus forming several experimental message corpuses containing both spam and non-spam. The operation of an exemplary filter training engine was conducted for every such message corpus. For an average of 2,000-3,000 messages per corpus, the average number of message clusters was 38. The pattern extractor produced an average of 30 spam identification text patterns per cluster, which further resulted in 2-3 spam identification signatures per cluster.

The calculation was conducted on an OptiPlex® GX520 desktop from Dell™, with 1 GB RAM and an Intel™ Pentium® 4, 800 MHz processor. For an average of 2,000-3,000 messages per corpus, the average computation times were as follows: about 15 minutes per corpus for message layout clustering, about 12 minutes per cluster for pattern extraction (string search using suffix trees), about 10 seconds per cluster for pattern selection (Relief algorithm), and about 27 minutes per cluster for signature optimization. A filter training system configured for parallel processing (e.g. as shown in FIG. 3-B) may be capable of producing new spam identification signatures automatically (i.e. not requiring human supervision) within hours or minutes (e.g. every hour).

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising a memory storing instructions which, when executed, cause the computer system to form: a message aggregator configured to assign messages of a spam message corpus to a plurality of spam message clusters, the plurality of spam message clusters including a first and a second spam message cluster, wherein the message aggregator is configured to compute a hyperspace representation of a message of the spam message corpus, and to assign the message to a selected cluster according to a hyperspace distance between the hyperspace representation and a center of the selected cluster;

a pattern extractor connected to the message aggregator and configured to, in response to assigning the messages to the plurality of spam message clusters, extract a first set of cluster-specific spam identification text patterns from members of the first spam message cluster; and a spam identification signature builder connected to the pattern extractor and configured to combine a first subset of the first set of cluster-specific spam identification text patterns into a first set of spam identification signatures for the first spam message cluster, wherein each spam identification signature of the first set of spam identification signatures includes a predetermined conjunction of at least two spam identification text patterns of the first subset of the first set of cluster-specific spam identification text patterns.

2. The system of claim 1, wherein the pattern extractor is configured to extract a second set of cluster-specific spam identification text patterns from members of the second spam message cluster, and wherein the spam identification signature builder is configured to combine a second subset of the second set of cluster-specific spam identification text patterns into a second set of spam identification signatures for the second spam message cluster, wherein each spam identification signature of the second set of spam identification signatures includes a predetermined conjunction of at least two spam identification text patterns of the second subset of the second set of cluster-specific spam identification text patterns.

3. The system of claim 1, further comprising a message classifier connected to the spam identification signature builder and configured to determine whether an incoming message is spam or non-spam according to the first set of spam identification signatures.

4. The system of claim 3, wherein the message classifier is configured to determine whether the incoming message is spam or non-spam according to the second set of spam identification signatures.

5. The system of claim 1, wherein the message aggregator is configured to assign a message of the spam message corpus to a selected cluster according to a set of message layout features of the message, wherein the message layout features include a set of relative positions of a plurality of message metaword substructures.

6. The system of claim 1, wherein the pattern extractor is configured to compute one of the first set of cluster-specific spam identification text patterns according to a suffix tree representation of a cluster-specific character string, wherein the cluster-specific character string includes a section of a message of the first spam message cluster.

7. The system of claim 1, wherein the spam identification signature builder comprises a signature optimizer configured to evaluate a spam-identification effectiveness of the first set of spam identification signatures, and to optimize the first set of spam identification signatures according to the spam-identification effectiveness.

8. The system of claim 7, wherein optimizing the first set of spam identification signatures comprises performing a mutation of a first spam identification signature of the first set of spam identification signatures.

9. The system of claim 7, wherein optimizing the first set of spam identification signatures comprises performing a crossover recombination of a first and a second spam identification signature of the first set of spam identification signatures, wherein performing the crossover recombination comprises swapping each value of a first set of elements of the first spam identification signature with a corresponding value of a second set of elements of the second spam identification signature.

10. The system of claim 1, wherein the message aggregator is configured to receive an updated message corpus and assign messages of the updated message corpus to the plurality of spam message clusters, and wherein the spam identification signature builder is configured to generate updated spam identification signatures for the plurality of message clusters using the updated message corpus.

11. A computer-implemented method comprising:
assigning messages of a spam message corpus to a plurality of spam message clusters, the plurality of spam message clusters including a first and a second spam message cluster, wherein assigning messages of the spam message corpus to the plurality of spam message clusters comprises computing a hyperspace representation of a message of the spam message corpus, and assigning the message to a selected cluster according to a hyperspace distance between the hyperspace representation and a center of the selected cluster;
in response to assigning the messages to the plurality of spam message clusters, extracting a first set of cluster-specific spam identification text patterns from members of the first spam message cluster; and
combining a first subset of the first set of cluster-specific spam identification text patterns into a first set of spam identification signatures for the first spam message cluster, wherein each spam identification signature of the first set of spam identification signatures includes a predetermined conjunction of at least two spam identification text patterns of the first subset of the first set of cluster-specific spam identification text patterns.

12. The method of claim 11, further comprising:
extracting a second set of cluster-specific spam identification text patterns from members of the second spam message cluster, and
combining a second subset of the second set of cluster-specific spam identification text patterns into a second set of spam identification signatures for the second spam message cluster, wherein each spam identification signature of the second set of spam identification signatures includes a predetermined conjunction of at least two spam identification text patterns of the second subset of the second set of cluster-specific spam identification text patterns.

13. The method of claim 11, further comprising determining whether an incoming message is spam or non-spam according to the first set of spam identification signatures.

14. The method of claim 13, further comprising determining whether the incoming message is spam or non-spam according to the second set of spam identification signatures.

15. The method of claim 11, comprising assigning a message of the spam message corpus to a selected cluster according to a set of message layout features of the message, wherein the message layout features include a set of relative positions of a plurality of message metaword substructures.

16. The method of claim 11, further comprising computing one of the first set of cluster-specific spam identification text patterns according to a suffix tree representation of a cluster-specific character string, wherein the cluster-specific character string includes a section of a message of the first spam message cluster.

17. The method of claim 11, further comprising evaluating a spam-identification effectiveness of the first set of spam identification signatures, and optimizing the first set of spam identification signatures according to the spam-identification effectiveness.

18. The method of claim 17, wherein optimizing the first set of spam identification signatures comprises performing a mutation of a first spam identification signature of the first set of spam identification signatures.

19. The method of claim 17, wherein optimizing the first set of spam identification signatures comprises performing a crossover recombination of a first and a second spam identification signature of the first set of spam identification signatures, wherein performing the crossover recombination comprises swapping each value of a first set of elements of the first spam identification signature with a corresponding value of a second set of elements of the second spam identification signature.

20. The method of claim 11, further comprising receiving an updated message corpus, assigning messages of the updated message corpus to the plurality of spam message clusters, and generating updated spam identification signatures for the plurality of message clusters using the updated message corpus.

21. A computer-implemented spam-filtering method comprising:
receiving a set of cluster-specific spam identification signatures, wherein the cluster-specific spam identification signatures are generated by: assigning messages of a spam message corpus to a plurality of spam message clusters including a first and second spam message cluster, wherein assigning messages of the spam message corpus to the plurality of spam message clusters comprises computing a hyperspace representation of a message of the spam message corpus, and assigning the message to a selected cluster according to a hyperspace distance between the hyperspace representation and a center of the selected cluster;

in response to assigning the messages to the plurality of spam message clusters, extracting a set of cluster-specific spam identification text patterns from members of the first spam message cluster; and combining a subset of the set of cluster-specific spam identification text patterns into a set of cluster-specific spam identification signatures for the first spam message cluster, wherein each spam identification signature includes a predetermined conjunction of at least two spam identification text patterns; and deciding whether an incoming message is spam or non-spam according to the cluster-specific spam identification signatures.

22. A non-transitory computer-readable storage medium encoding instructions which, when executed on a computer system, cause the computer system to perform the steps of:

assigning messages of a spam message corpus to a plurality of spam message clusters, the plurality of spam message clusters including a first and a second spam message cluster, wherein assigning messages of the spam message corpus to the plurality of spam message clusters comprises computing a hyperspace representation of a message of the spam message corpus, and assigning the message to a selected cluster according to a hyperspace distance between the hyperspace representation and a center of the selected cluster;

in response to assigning the messages to the plurality of spam message clusters, extracting a set of cluster-specific spam identification text patterns from members of the first spam message cluster; and combining a subset of the set of cluster-specific spam identification text patterns into a set of spam identification signatures for the first spam message cluster, wherein each spam identification signature of the set of spam identification signatures includes a predetermined conjunction of at least two spam identification text patterns of the subset of the set of cluster-specific spam identification text patterns.

23. A non-transitory computer-readable storage medium encoding instructions which, when executed on a computer system, cause the computer system to perform the steps of:

receiving a set of cluster-specific spam identification signatures, wherein the cluster-specific spam identification signatures are generated by:

assigning messages of a spam message corpus to a plurality of spam message clusters including a first and second spam message cluster, wherein assigning messages of the spam message corpus to the plurality of spam message clusters comprises computing a hyperspace representation of a message of the spam message corpus, and assigning the message to a selected cluster according to a hyperspace distance between the hyperspace representation and a center of the selected cluster;

in response to assigning the messages to the plurality of spam message clusters, extracting a set of cluster-specific spam identification text patterns from members of the first spam message cluster; and combining a subset of the set of cluster-specific spam identification text patterns into a set of cluster-specific spam identification signatures for the first spam message cluster, wherein each spam identification signature includes a predetermined conjunction of at least two spam identification text patterns; and deciding whether an incoming message is spam or non-spam according to the cluster-specific spam identification signatures.

24. The system of claim 1, wherein each spam identification signature consists of a predetermined conjunction of a plurality of spam identification text patterns.

* * * * *